US00RE39258E

(19) United States
(12) Reissued Patent
Cosma et al.

(10) Patent Number: US RE39,258 E
(45) Date of Reissued Patent: Sep. 5, 2006

(54) MULTI-CYCLE, ENGINE BRAKING WITH POSITIVE POWER VALVE ACTUATION CONTROL SYSTEM AND PROCESS FOR USING THE SAME

(75) Inventors: Gheorghe Cosma, Windsor, CT (US); James Usko, North Granby, CT (US)

(73) Assignee: Jacobs Vehicle Systems, Inc., Bloomfield, CT (US)

(21) Appl. No.: 10/013,988

(22) Filed: Dec. 13, 2001

Related U.S. Patent Documents

Reissue of:
(64) Patent No.: 6,000,374
Issued: Dec. 14, 1999
Appl. No.: 08/997,610
Filed: Dec. 23, 1997

(51) Int. Cl.
*F02D 13/04* (2006.01)

(52) U.S. Cl. ..... 123/321
(58) Field of Classification Search ..... 123/320, 123/321, 322
See application file for complete search history.

(56) References Cited

U.S. PATENT DOCUMENTS 3,220,392 A * 11/1965 Cummins ..... 123/182.1
4,572,114 A * 2/1986 Sickler ..... 123/21
4,688,384 A * 8/1987 Pearman et al. ..... 60/600
5,117,790 A * 6/1992 Clarke et al. ..... 123/198 F
5,146,890 A * 9/1992 Gobert et al. ..... 123/321
5,150,678 A * 9/1992 Wittmann et al. ..... 123/321
5,183,018 A * 2/1993 Vittorio et al. ..... 123/321
5,404,851 A * 4/1995 Neitz et al. ..... 123/321
5,406,918 A * 4/1995 Joko et al. ..... 123/321
5,460,131 A * 10/1995 Usko ..... 123/321
5,477,824 A * 12/1995 Reedy ..... 123/322
5,479,896 A * 1/1996 Freiburg et al. ..... 123/322
5,537,976 A * 7/1996 Hu ..... 600/544
5,586,531 A * 12/1996 Vittorio ..... 123/320
5,619,965 A * 4/1997 Cosma et al. ..... 123/322
5,626,116 A * 5/1997 Reedy et al. ..... 123/321
5,680,841 A * 10/1997 Hu ..... 123/321
5,692,469 A * 12/1997 Rammer et al. ..... 123/321
5,724,939 A * 3/1998 Faletti et al. ..... 123/321
5,803,038 A * 9/1998 Ihara et al. ..... 123/321
5,816,216 A * 10/1998 Egashira et al. ..... 123/321
5,829,397 A * 11/1998 Vorih et al. ..... 123/198 D
5,839,453 A * 11/1998 Hu ..... 123/321
5,992,376 A * 11/1999 Okada et al. ..... 123/321

* cited by examiner

*Primary Examiner*—Erick Solis
(74) *Attorney, Agent, or Firm*—David R. Yohannan, Esq.; Collier Shannon Scott

(57) ABSTRACT

An apparatus and method for effectuating multi-cycle engine braking is disclosed. The present invention controls the operation of the engine valves to permit more than one compression release event during a single engine operating cycle. The apparatus includes an assembly for operating at least one exhaust valve of an engine cylinder during a positive power operation. The apparatus further includes an assembly for operating at least one intake valve of the engine cylinder. The apparatus further including an assembly for operating the at least one exhaust valve during an engine braking operation.

50 Claims, 14 Drawing Sheets

*AMENDED*

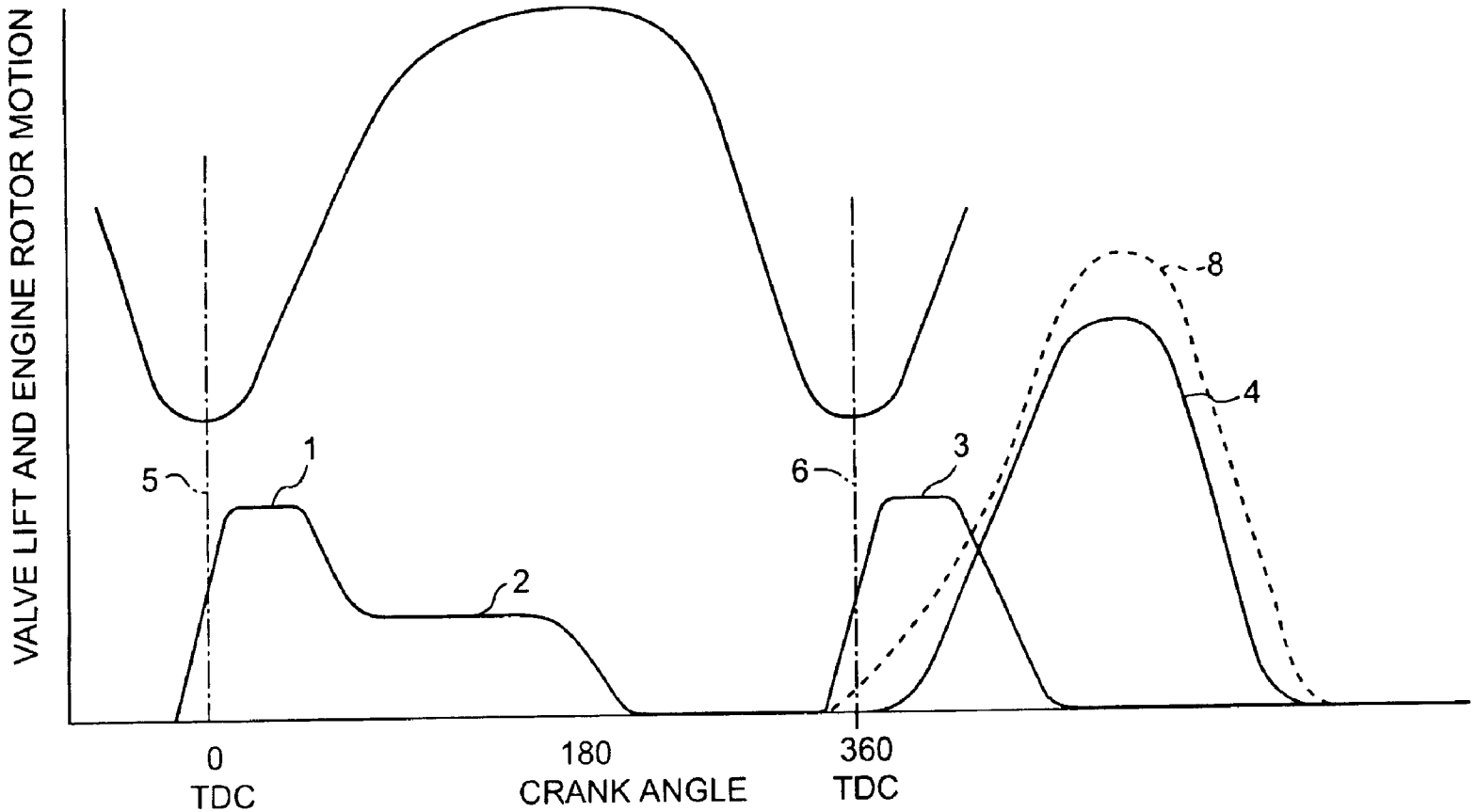
FIG. 3
AMENDED

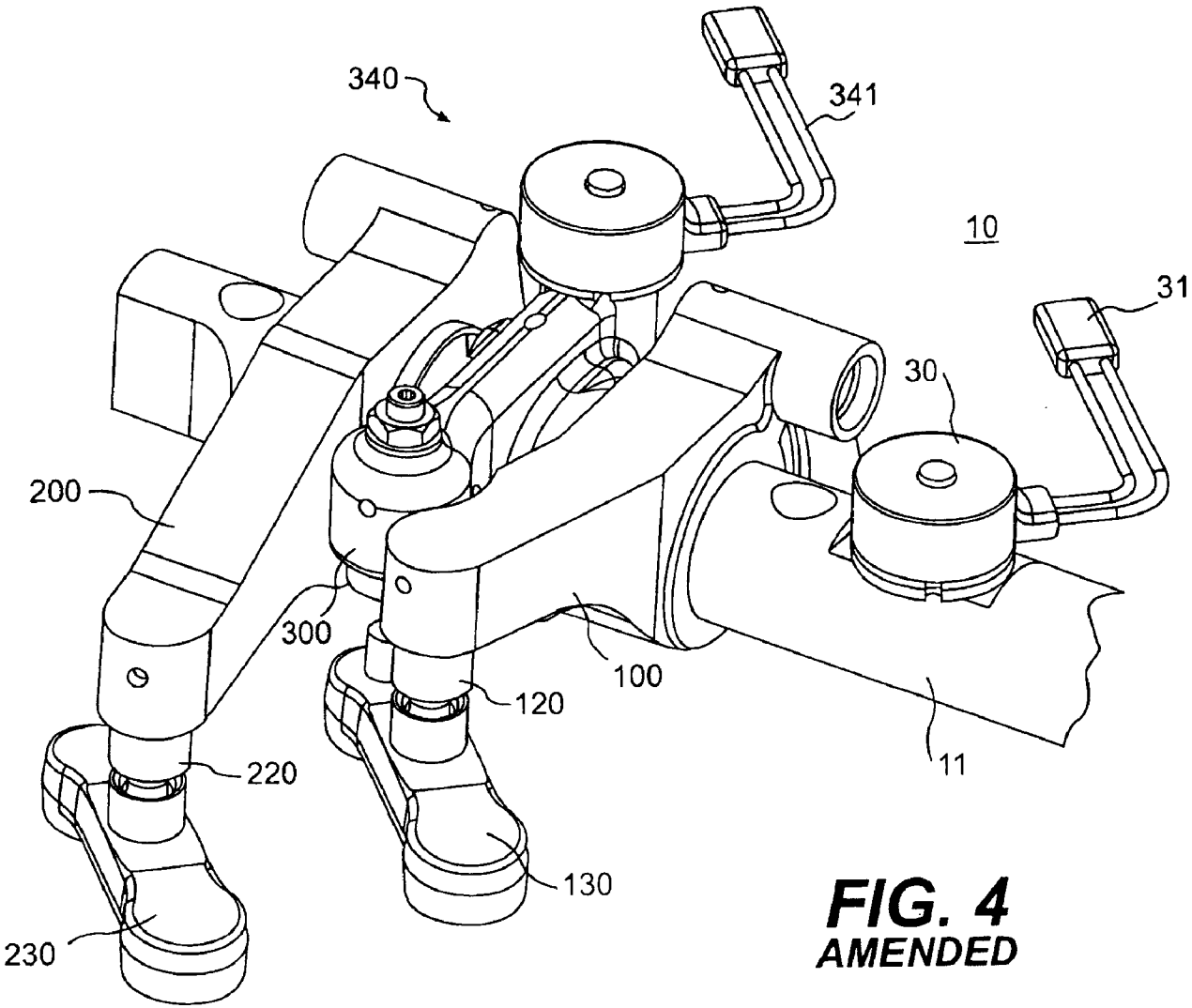
FIG. 4
AMENDED

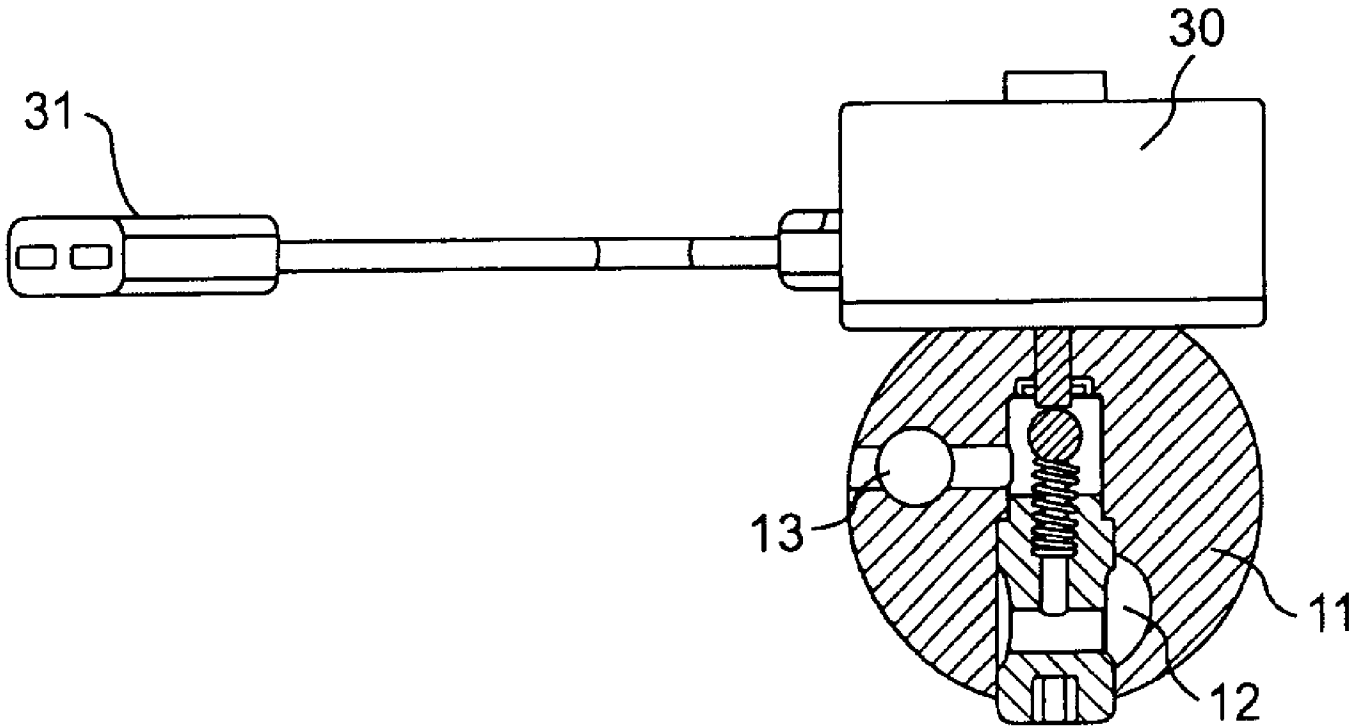
FIG. 6
AMENDED

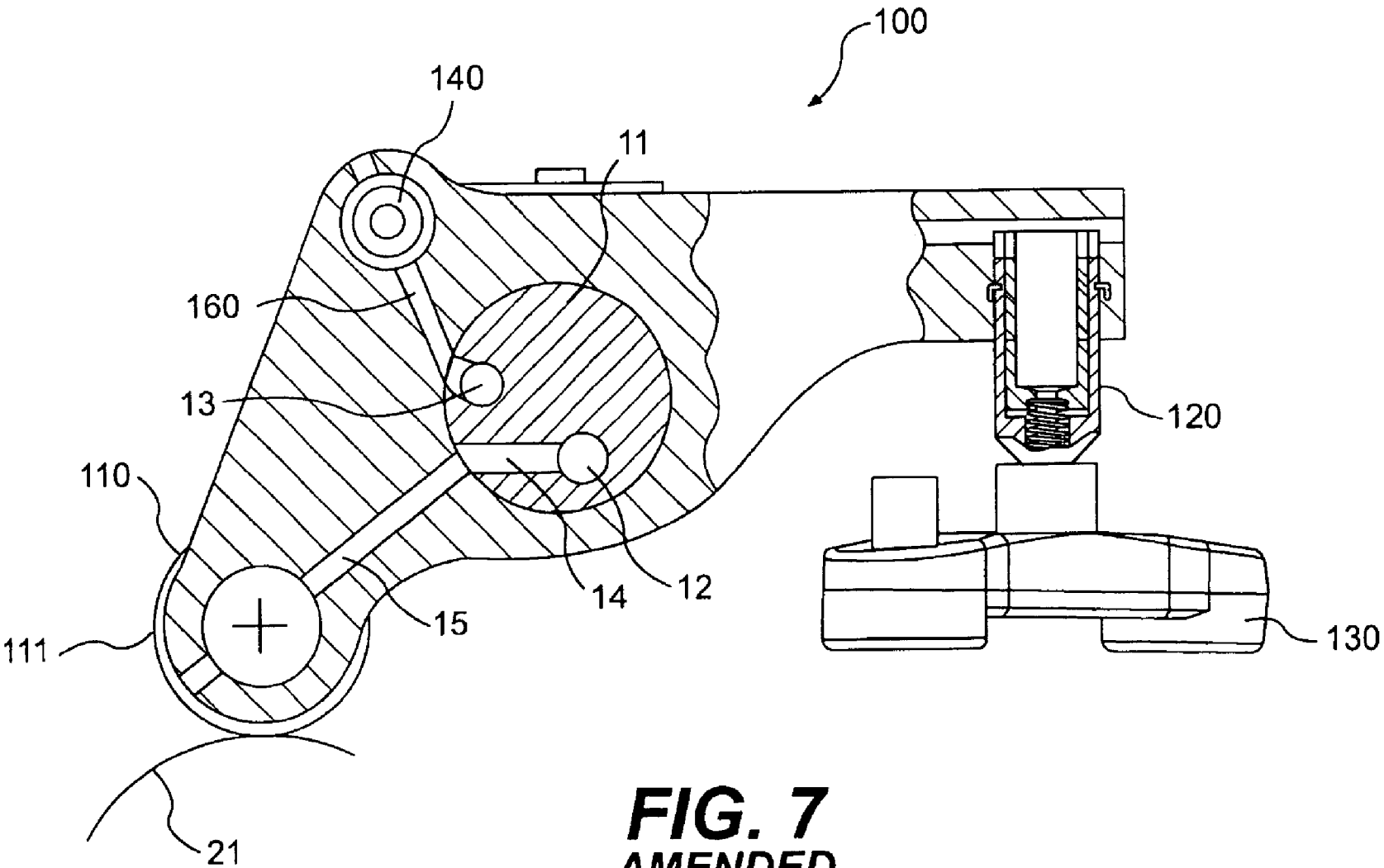
FIG. 7
AMENDED

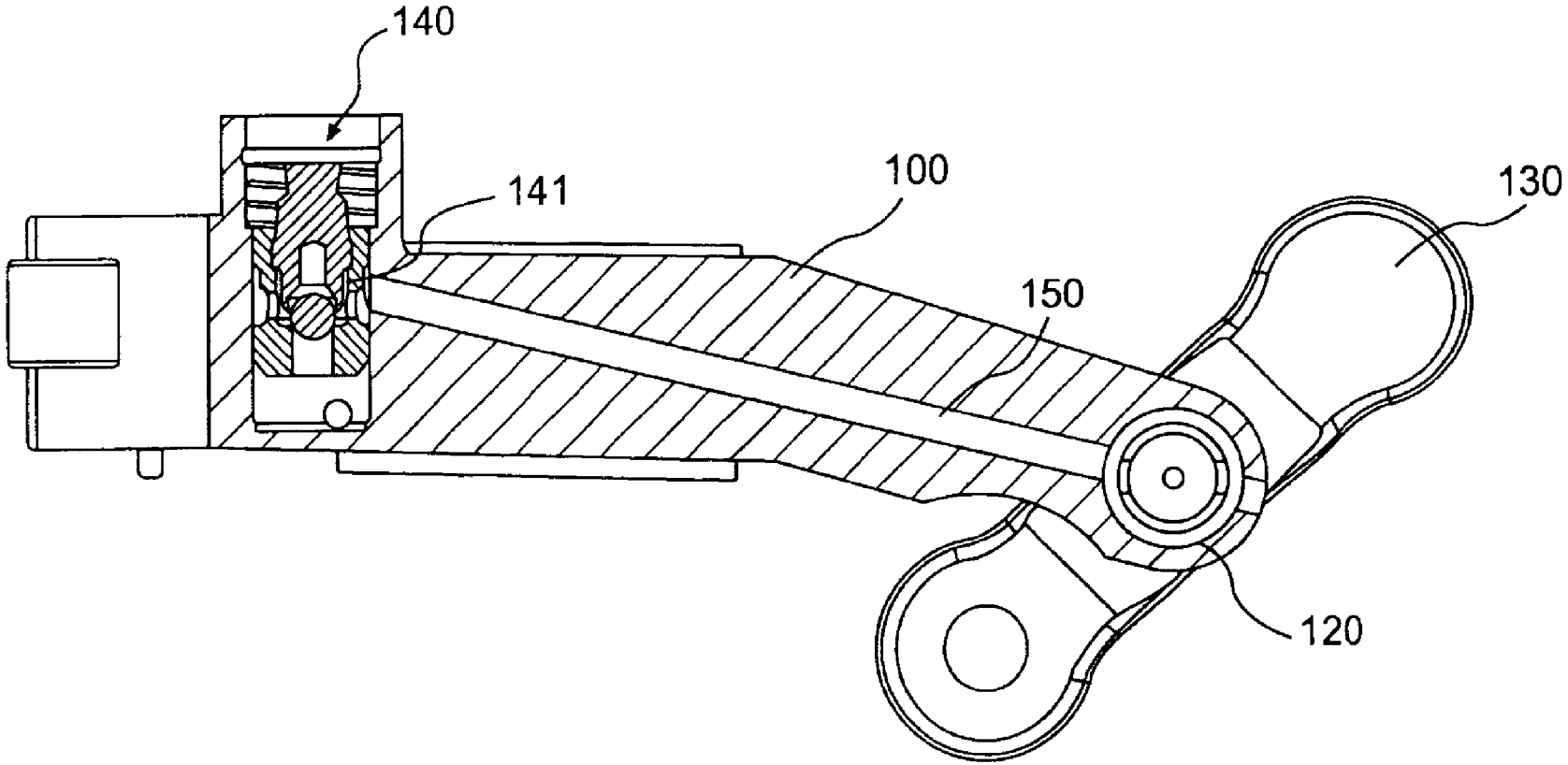
FIG. 8
AMENDED

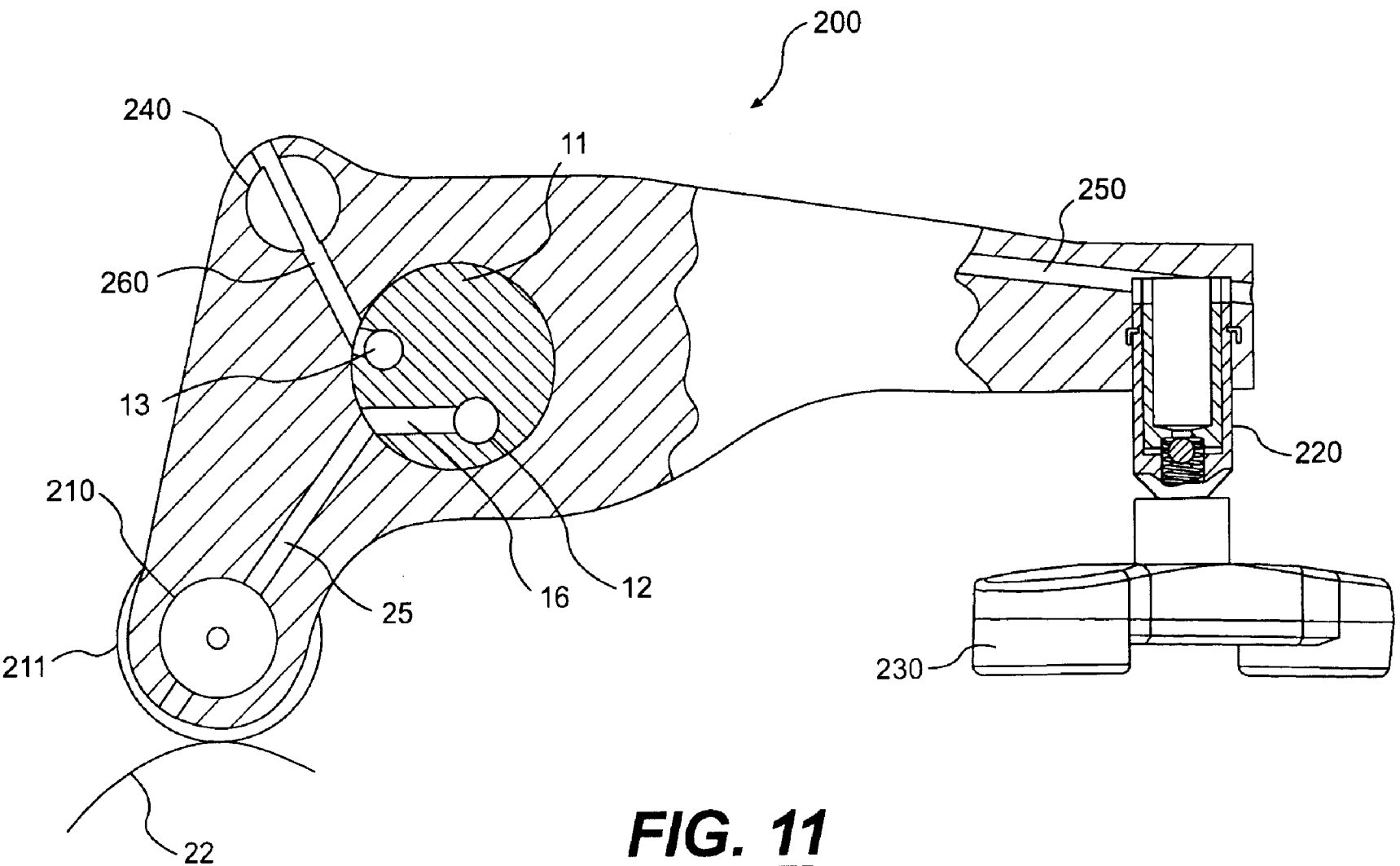
FIG. 11
AMENDED

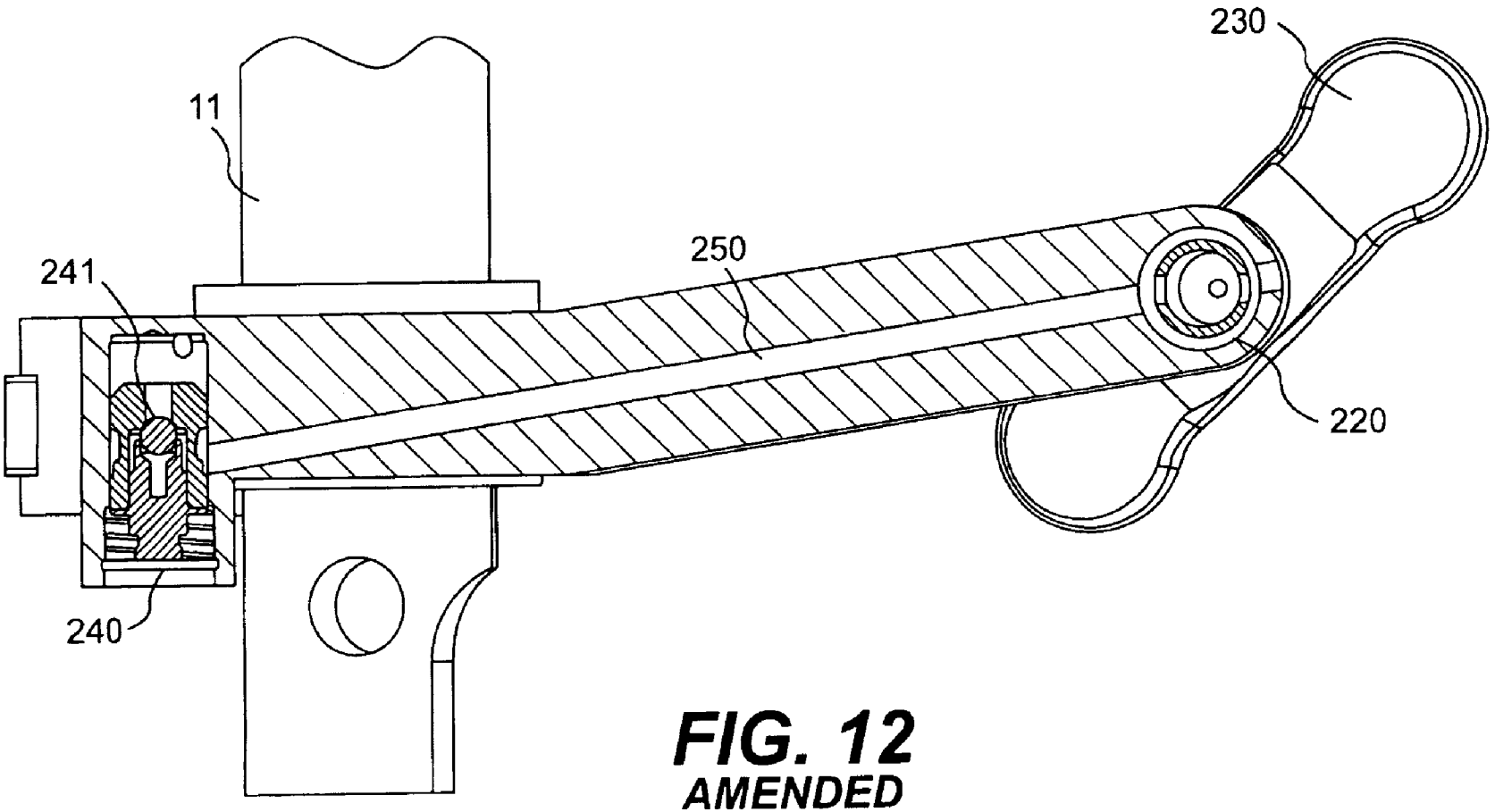
FIG. 12
AMENDED

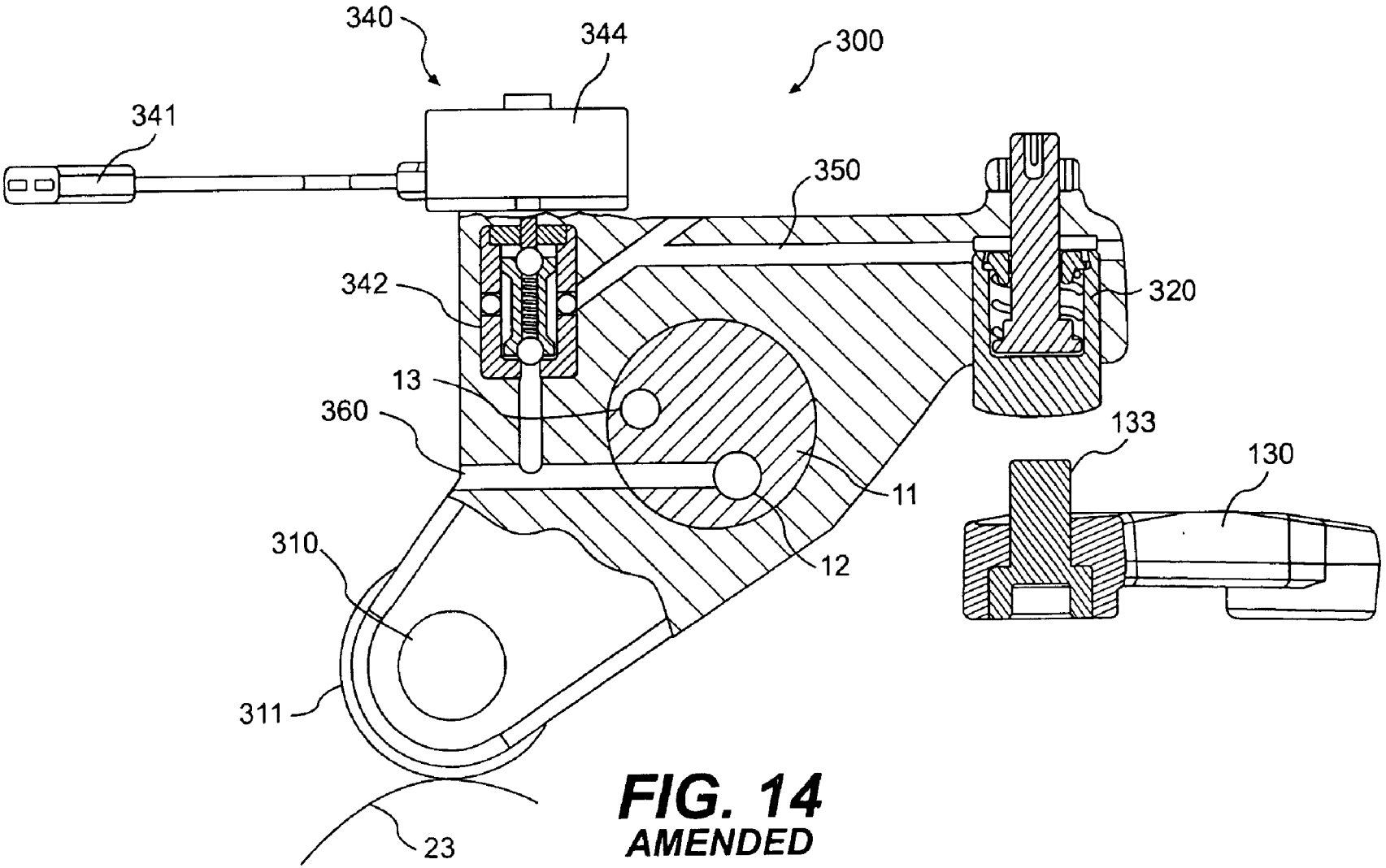
FIG. 14
AMENDED

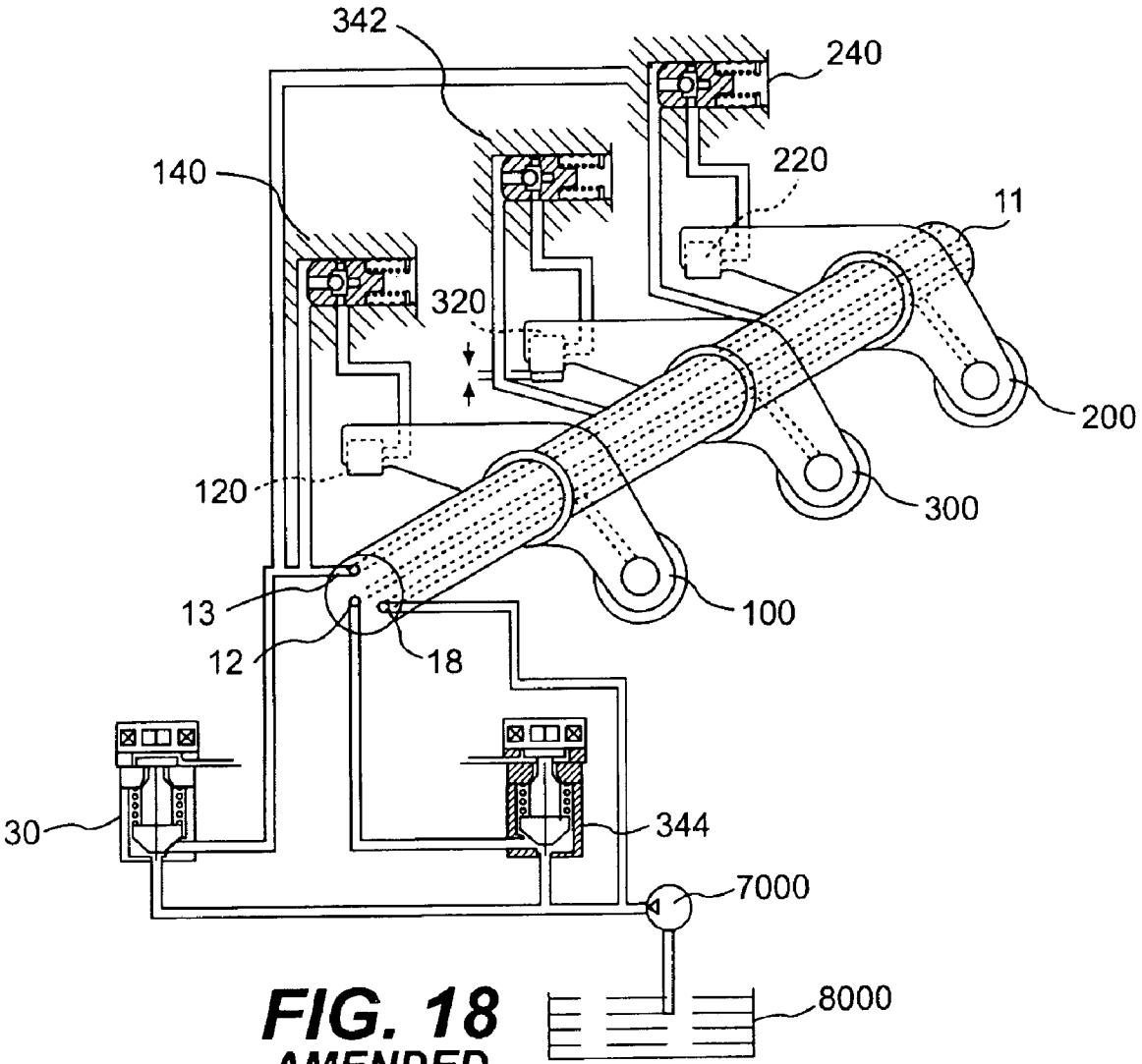
FIG. 18
AMENDED

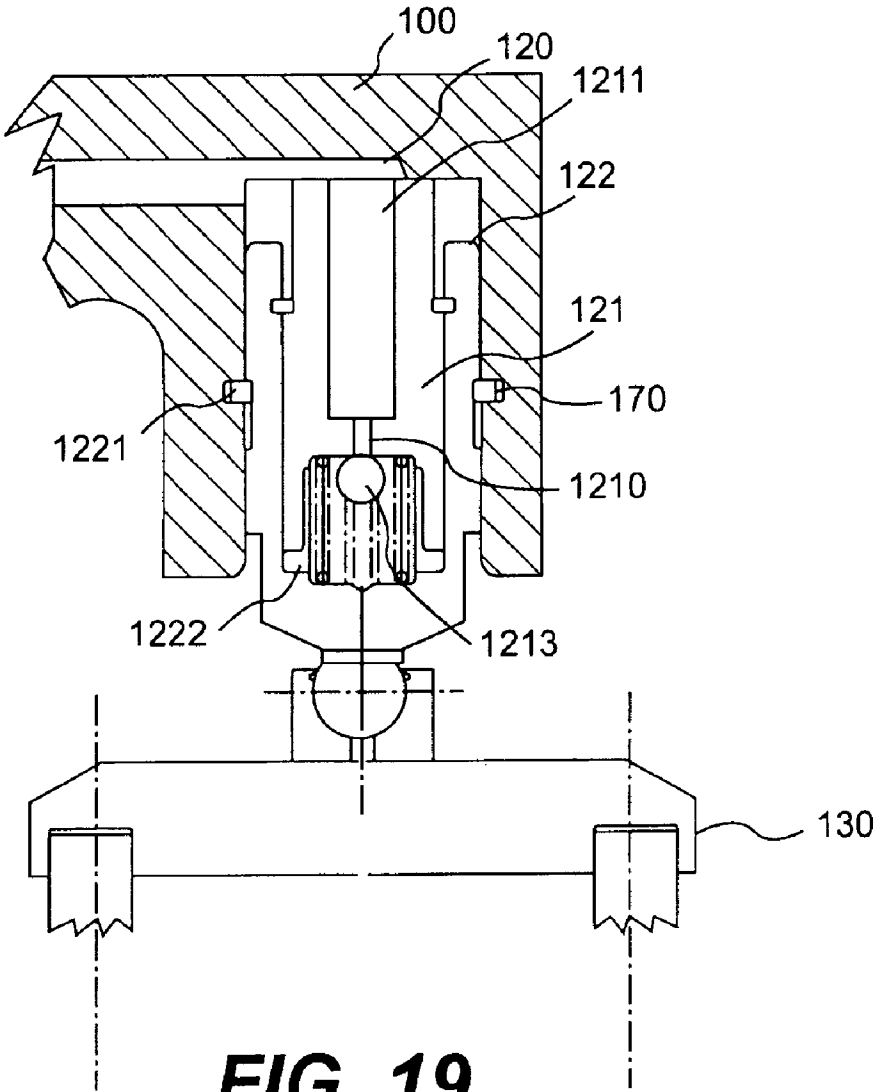
FIG. 19
NEW

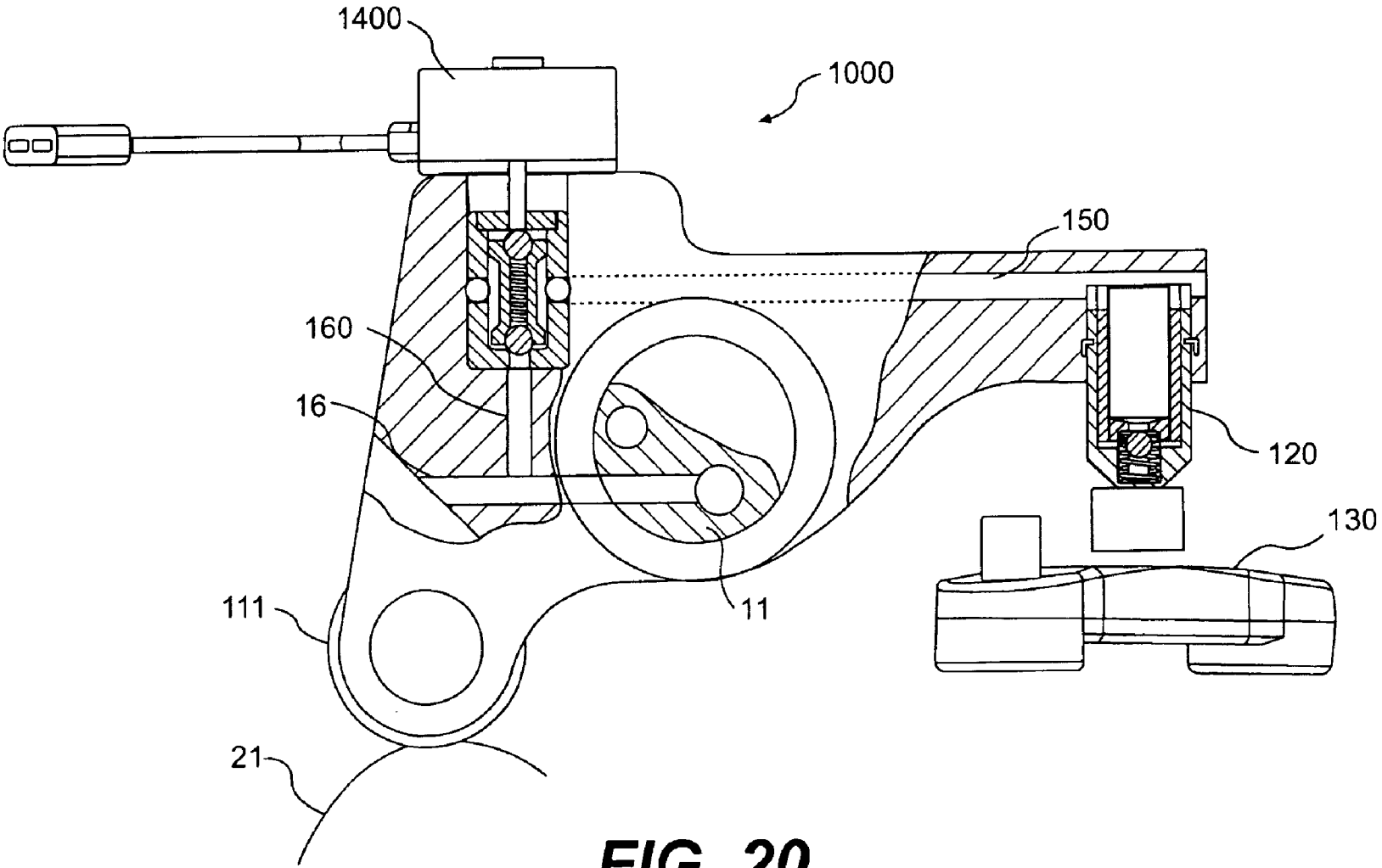
FIG. 20
NEW

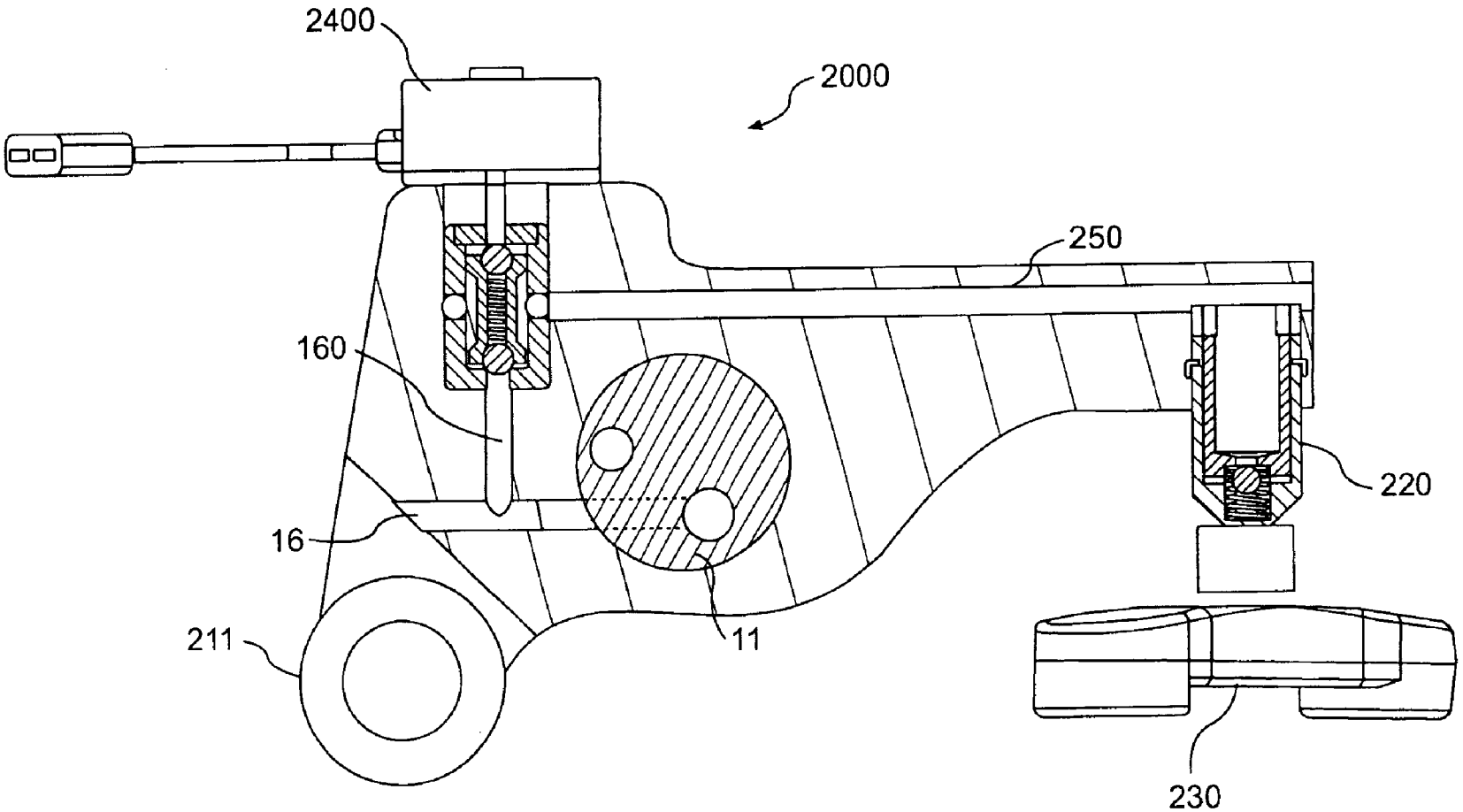
FIG. 21
NEW

MULTI-CYCLE, ENGINE BRAKING WITH POSITIVE POWER VALVE ACTUATION CONTROL SYSTEM AND PROCESS FOR USING THE SAME

Matter enclosed in heavy brackets [ ] appears in the original patent but forms no part of this reissue specification; matter printed in italics indicates the additions made by reissue.

FIELD OF THE INVENTION

The present invention relates generally to the field of compression release engine retarders for internal combustion engines. In particular, it relates to a method for increasing the retarding power of the retarder by generating two braking events, one per engine revolution, for each cylinder of the engine "two cycle braking." More specifically, the invention involves modifying the cam and rocker arms on a overhead cam engine to provide a dedicated cam lobe for braking. In addition, the classic compression release retarder housing is eliminated and the compression release retarder is associated with the rocker arms.

The exhaust valves of a typical internal combustion engine open at least once during its two-stroke or four-stroke cycle. A second opening of the exhaust valves can be introduced on the compression stroke to achieve additional compression release retarding. The present invention eliminates the first exhaust valve opening on the normal exhaust stroke and substitutes a compression release event later in the exhaust stroke. In addition, the opening of the intake valve is delayed, to increase the effectiveness of the second compression release event, at the end of the exhaust stroke. The present invention can also be combined with exhaust gas recirculation on either the compression or exhaust strokes, or both, to further enhance retarding power.

This provides a number of benefits, including increased retarding power, reduced cost, and further integration of the compression release retarder with the design of the engine overhead. Furthermore, under positive power the present invention provides greater control over the operation of the intake valves and the exhaust valves. This provides for improved fuel economy, emissions and optimized performance over the complete engine speed range.

BACKGROUND OF THE INVENTION

With many engines it is desirable to have both a positive power mode of operation (in which the engine produces power for such purposes as propelling an associated vehicle) and a braking mode operation (in which the engine absorbs power for such purposes as slowing down an associated vehicle). It is well known that a highly effective way of operating an engine in braking mode is to cut off the fuel supply to the engine and to then open the exhaust valves in the engine near top dead center of the compression strokes of the engine cylinders. This allows air that the engine has compressed in its cylinders to escape to the exhaust system of the engine before the engine can recover the work of compressing the air during the subsequent "power" strokes of the engine pistons. This type of engine braking is known as compression release engine braking.

It takes a great deal more force to open an exhaust valve to produce a compression release event during compression release engine braking than to open either an intake or exhaust valve during positive power mode operation of the engine. During positive power mode operation the intake valves typically open while the piston is moving away from the valves, thereby creating a low pressure condition in the engine cylinder. Thus the only real resistance to intake valve opening is the force of the intake valve return spring which normally holds the intake valve closed. Similarly, during positive power mode operation the exhaust valves typically open near the end of the power strokes of the associated piston after as much work as possible has been extracted from the combustion products in the cylinder. The piston is again moving away from the valves and the cylinder pressure against which the exhaust valves must be opened is again relatively low. (Once opened, the exhaust valves are typically held open throughout the subsequent exhaust stroke of the associated piston, but this only requires enough force to overcome the exhaust valve return spring force.)

Four cycle internal combustion engines, conventionally, are outfitted with either mechanical or hydro-mechanical intake and exhaust opening systems. These systems may include a combination of camshafts, rocker arms and push rods that operate synchronously with the engine's crankshaft rotation. The timing of the valve openings is fixed in relationship to the position of the crankshaft by direct mechanical connection of the valve actuating system with the crankshaft. In any cylinder, of a multi-cylinder internal combustion engine, intake and exhaust valve openings and closings in conjunction with the fuel mixture and either ignition or fuel injection, are predetermined to provide optimum positive power over a range of engine speeds. This relationships between the piston motion of a cylinder and its intake and exhaust valve openings and closings, for a conventional internal combustion engine is illustrated in FIG. 1.

The crankshaft of a four-cycle internal combustion engine rotates through 720° during one series of its four strokes (i.e., compression, expansion, exhaust and intake). FIG. 1 depicts the relationships between the piston and valves beginning with the piston at top dead center ("TDC") of the compression stroke 5. Both the intake and exhaust valves are closed, and remain closed during most of the expansion stroke wherein the piston is traveling away from the cylinder head (i.e., the volume between the cylinder head and the piston head is increasing). Fuel is burned during the expansion stroke and positive power is delivered by the engine. As the piston reverses direction at the end of the expansion stroke, the exhaust valve opens, illustrated as 7 in FIG. 1 and combustion gases are forced out of the cylinder as the piston travels again to exhaust TDC 6. Just prior to the exhaust TDC, the intake valve opens, illustrated as 8 in FIG. 1. Immediately after the exhaust TDC, the exhaust valve closes, and air or fuel mixture is drawn into the cylinder chamber through the intake valve as the piston travels away from the cylinder head. The intake valve closes when the piston is near the or in the proximity of the furthest distance from the cylinder head. Subsequently, both the intake and exhaust valves are closed, and the compression stroke begins bringing the piston to TDC and the four cycle repeats.

FIG. 2 illustrates the required intake and exhaust valve openings that occur when an internal combustion engine operates in a braking mode (i.e., as a compressor wherein the compressed air is evacuated at the vicinity of TDC compression). FIG. 2 also illustrates engine piston motion. During the braking mode, no fuel as being supplied to the engine. As a result, only air is being compressed during the compression stroke. FIG. 2 depicts the normal intake and exhaust valve openings (i.e., during positive power) during the exhaust and intake strokes of the piston. Additionally, an exhaust valve opening 9 is shown immediately before the completion of the compression stroke and subsequent to the closing prior to the beginning of the exhaust stroke. There are other options. This is just one example of an exhaust cam operated compression release brake. Engine braking is achieved during the compression stroke and the evacuation, by way of the added exhaust valve opening, of the compressed air immediately following.

The aforementioned process described compression release engine braking. The additional exhaust valve opening is achieved by adding components that actuate an exhaust valve independently from the normal actuating mechanisms. This is typically achieved by actuating the lifting mechanism of the exhaust valve by way of a secondary hydro-mechanical system that can be deactivated when the engine is operating in its positive power mode. In summary, the secondary system lifts the exhaust valve, at an appropriate time, and does not interfere with, nor interrupt, the normal valve lifting mechanism, and is inactive during positive power operation. Timing of the secondary system's valve lifting is usually derived from the activation of an adjacent cylinder's normal intake or exhaust valve's opening or the injection actuation mechanism. A neighboring cylinder, wherein a valve opening occurs nearest to the desired time for the active cylinder's exhaust valve opening is chosen. This approach, deriving timing from an adjacent cylinder's normal operation, eliminates the need for the secondary system to contain its own timing control.

The most common type of engine brake derives its motion from the injector cam of the same cylinder.

Conventional single-cycle engine braking systems have inherent limitations. These limitations are introduced primarily by (1) secondary valve actuating systems derive there timing from an adjacent cylinder's normal valve opening timing via hydromechanical links; and (2) secondary systems do not interrupt the normal opening and closing of the cylinder intake and exhaust valves during positive power. The first circumstance generally results in a sub-optimum realization of the full engine braking potential. This occurs because the timing and duration of the exhaust valve opening to vent the cylinder at the completion of the compression braking stroke is fixed by an adjacent cylinder's normal timing or injector timing of that cylinder during valve opening duration. The second circumstance prevents exploiting a second compression braking cycle because the exhaust valve is open during the exhaust stroke. Otherwise, the second cycle is available for compression braking. Consequently, a system that takes control of the actuation of the cylinder intake and exhaust valves enables or disables their opening. This can optimize engine performance in an engine braking mode.

Other internal combustion engine limitations have emerged in the thirty years since engine braking technology has been introduced. Emission controls, turbo-chargers, and exhaust braking have affected the performance of engine braking. The net effect is a reduction in conventional engine braking performance, particularly at low speeds when the turbo-charged air volume, available for compression, is small. During the same time, demand and reliances on conventional engine braking has increased. A further motivation for improved engine braking performance has emerged.

Engine retarders of the compression release-type are well-known in the art. Engine retarders are designed to convert, at least temporarily, an internal combustion engine of either the spark-ignition or compression-ignition type into an air compressor. In doing so, the engine develops retarding horsepower to help slow the engine down. This can provide the operator increased control over the vehicle, and substantially reduce wear on the service brakes of the vehicle. A properly designed and adjusted compression release-type engine retarder can develop retarding horsepower that is a substantial portion of the operating horsepower developed by the engine on positive power.

A compression release-type retarder of this type supplements the braking capacity of the primary vehicle wheel braking system. In so doing, it extends substantially the life of the primary (or wheel) braking system of the vehicle. The basic design for a compression release engine retarding system of the type involved with this invention is disclosed in Cummins, U.S. Pat. No. 3,220,392.

The compression release-type engine retarder disclosed in the Cummins '392 patent employs a hydraulic control system. The hydraulic control system of typical compression release-type engine retarders used prior to the present invention engage the valve actuation system of the engine. When the engine is under positive power, the hydraulic control system of a typical compression release engine retarder is disengaged from the valve control system. When compression release-type retarding is desired, the fuel supply is stopped and the hydraulic control system of the compression release brake causes the compression release brake to engage the valve control system of the engine.

Compression release-type engine retarders typically employ a hydraulic system in which a master piston engages the valve control or injector system of the engine. When the retarder is activated, a solenoid valve allows lube oil to fill a hydraulic circuit which actuates the master piston which is hydraulically connected to a slave piston. The motion of the master piston controls the motion of the slave piston, which in turn typically opens the exhaust valve of the internal combustion engine at a point near the end of the compression stroke. In doing so, the work that is done in compressing the intake air cannot be recovered during the subsequent expansion (or power) stroke of the engine. Instead, it is dissipated through the exhaust. By dissipating energy developed from the work done in compressing the intake gases, the compression release-type retarder dissipates energy from the engine, slowing the vehicle down.

The master piston in typical compression release engine retarders of the type known prior to the present invention is typically driven by a push tube that is controlled by the engine camshaft. The force required to open the exhaust valve is transmitted back through the hydraulic system to the push tube and the camshaft. Historically, it has been desirable to minimize modification of the engine, as many compression release-type retarders were installed as after market items. Accordingly, a push tube that otherwise moves at a point in the engine cycle close to the desired time to operate the compression release engine retarder was typically selected for actuating the master piston. In some cases, to exhaust valve push tube associated with another engine cylinder was selected. In yet other cases, it was convenient to use the fuel injector cam lobe or push tube associated with the cylinder that was undergoing the compression event. It is also possible to use an intake valve push tube. Additionally, there are other ways to operate the master piston.

Regardless of the specific actuation means chosen, inherent limits wee imposed on operation of the compression release-type retarder based on the allowable loads on the engine. A number of mechanical factors have historically imposed limitations: the temperature of critical engine parts, such as valves; the seating velocity of the valves; push tube loads; cam stress, the power available from the compression release retarder to overcome the instantaneous cylinder pressure at the point of opening and a variety of other factors. Typically, it is desired to open the compression release-type engine retarder as late in the engine cycle as possible. In this way, the engine develops a higher degree of compression, allowing more energy to be dissipated through the compression release retarder. Delaying the opening of the exhaust valve in the compression release event to a point later in the compression stroke, however, also increased substantially the loading placed on critical engine components.

Safety, reliability and environmental demands have pushed the technology of compression release engine retarding significantly over the past 30 years. Compression release retarding systems are typically adapted to a particular engine in order to maximize the retarding horsepower that could be developed, consistent with the mechanical limitations of the engine system. In addition, over the decades during which these improvements were made, compression release-type engine retarders garnered substantial commercial success. Engine manufacturers became more willing to embrace compression release retarding technology. Compression release-type retarders have continued to enjoy substantial and continuing commercial success in the marketplace. Accordingly, engine manufacturers have been more willing to make engine design modifications, in order to accommodate the compression release-type engine retarder, as well as to improve its performance and efficiency.

In addition to these pressures, significant environmental pressures have forced engine manufacturers to explore a variety of new ways to improve the efficiency of their engines. These changes have forced a number of engine modifications. Engines have become smaller and more fuel efficient. Yet, the demands on retarder performance have often increased, requiring the compression release-type engine retarder to generate greater amounts of retarding horsepower under more limiting conditions. A variety of ancillary equipment are currently employed on diesel type engines, including turbo-chargers, silencers, exhaust brakes, waste gate controls, electronic controls, sensors and other collateral apparatus.

Similarly, in an effort to secure greater performance, an engine may have a turbocharger. Another method of vehicle engine retarding has included the use of any device that causes a restriction in the turbo, or in which a restriction is imposed in the exhaust manifold, increasing the back pressure on the engine and making it harder for the piston to force gases out of the cylinder on the exhaust stroke. During the past decades many engine manufacturers, and operators, have used an exhaust restriction method on a turbo-charged engine in combination with a compression release-type retarder. The use of the exhaust restrictor, however, essentially "kills" the boost available from the turbo-charger, dramatically reducing the amount of air delivered to the engine on intake. This, in turn dramatically worsens compression release-type engine brake performance. Combination braking does result in an overall increase in retarding due to the practical effect of getting more air into the cylinder.

As the market for compression release-type engine retarders has developed and matured, these multiple factors have pushed the direction of technological development toward a number of goals, securing higher retarding horsepower from the compression release retarder, increasing mid-range performance and variable retarding capability; working with, in some cases, lower masses of air deliverable to the cylinders through the intake system; and the inter-relation of various collateral or ancillary equipment, such as turbo-chargers; and exhaust brakes. In addition, as the marked for compression release engine retarders has matured and moved from the after-market to original equipment manufacturers, engine manufacturers have shown an increased willingness to make design modifications to their engines that would increase the performance and reliability, and broaden the operating parameters, of the compression release-type engine retarder.

In addition, various techniques to improve the efficiency of the engine on positive power —and thereby reduce emissions—have also been incorporated into engines. Among the techniques that have been investigated is the recirculation of a certain portion of the exhaust gases through the engine to attempt to achieve more complete burning of the exhaust gases: exhaust gas recirculation.

Various manufacturers have incorporated exhaust gas recirculation systems into their engines. In some instances, these have been done to achieve exhaust gas recirculation for environmental reasons. In other instances, it has been done to add additional charge to the cylinder that is undergoing the compression release retarding event. Ueno, Japanese laid open Patent Publication No. Sho 63\1988-25330 (published Feb. 2, 1988), for Exhaust Brake Equipment for Internal Combustion Engine specifically discloses adding an additional cam lobe to open an exhaust valve at the end of the intake stroke or the starting part of the compression stroke. The engine described by Ueno also is equipped with an exhaust brake so that the back pressure in the exhaust manifold is significantly higher than the pressure in the cylinder. At that point, the exhaust gas recirculation event occurs forcing valve opening at the end of intake and/or beginning of compression. Consequently, higher pressure exhaust air from the exhaust manifold flows into the cylinder, increasing the amount of air in the cylinder during the succeeding compression stroke. The greater amount of gas in the cylinder at the beginning of the compression stroke generates increased retarding horsepower.

Volvo has also employed exhaust gas recirculation. Gobert et al., U.S. Pat. No. 5,146,890 for Method and a Device for Engine Braking a Four Stroke Internal Combustion Engine, discloses the addition of an exhaust gas recirculation lobe on the cam. The engine has for each cylinder at least one inlet valve and at least one exhaust valve for controlling communication between a combustion chamber in the cylinder and an inlet system and an exhaust system, respectively. The arrangement also establishes communication between the combustion chamber and the exhaust system in conjunction with the exhaust stroke and also when the piston is located in the proximity of its bottom-dead-center position after the inlet stroke and during the latter part of the compression stroke and during at least part of the expansion stroke. Communication of the combustion chamber with the exhaust system is effected upstream of a throttling device provided at the exhaust system, this throttling device being operative to throttle at least a part of the flow through the exhaust system during an engine braking operation, therewith to increase the pressure upstream of the throttling device. The exhaust gas recirculation lobe on the Volvo cam, however, is at a different cam timing than the exhaust gas recirculation of the present invention. Moreover, nothing in the Volvo '890 patent teaches or suggests two-cycle braking.

In a typical four-stroke internal combustion engine, the intake rocker arm and exhaust rocker arms have dedicated cam lobes. Historically, engine manufacturers have been reluctant to modify their engine configurations to provide a dedicated cam lobe for the compression release-type brake. In addition, on fuel injected engines, the fuel injector requires additional space on the cam shaft for the fuel injector cam lobe. This configuration has historically limited the amount of space available to provide additional cams to actuate the compression release brake system. The availability of a dedicated cam for the compression release brake system would simplify and improve the operation, reliability, and performance of the compression release-type braking system. Insufficient space has typically been available on the cam shaft, however, to accomplish that objective.

Recently, some manufacturer have begun manufacturing engines with two overhead cam shafts. This provides a greater overall amount of space along the cam shaft to use cams to directly actuate engine components. For example, one engine manufacturer has recently adopted a dual overhead cam shaft design. In the new engine, the fuel injector cam is located on a separate cam shaft, to provide a greater contact length along the cam to operate the fuel injector. This frees additional space along the second valve actuation cam shaft to provide cams that are dedicated to the operation of the compression release-type brake. It is in this type of situation that the present invention has particular application. As embodied herein, the present invention uses a dedicated cam to directly actuate a rocker arm for the compression release-type engine retarder, thereby eliminating push tubes and other associated hardware. This simplifies installation and maintenance of the brake and improves its reliability by reducing the number of parts that are susceptible to failure and, in particular, particularly high stress parts such as push tubes.

In addition, some engine manufacturers have attempted to redesign the overhead of the engine to employ a dedicated compression brake cam. For example, certain model engines feature overhead cam shafts. Engine manufacturers have redesigned the overhead of certain of its engine models to incorporate a dedicated brake cam compression release. For example Vittorio, U.S. Pat No. 5,586,531 assigned to Cummins Engine Company discloses an engine retarder cycle for an engine in which the exhaust valve is opened earlier during the compression stroke than previously contemplated. Vittorio discloses beginning the ripening of a retarder valve in an engine cylinder during a second half of a compression stroke of a piston in the engine cylinder. By opening the retarder valve earlier, the cylinder pressure is not allowed to build to as high a level as previously attained. The retarder valve is opened to a maximum displacement prior to a top dead center position of the piston. The retarder valve is then closed during the first half of the expansion stroke of the piston. Reedy et al., U.S. Pat. No. 5,626,116, assigned to Cummins Engine Company discloses a dedicated rocker lever and cam assembly for a compression braking system. The Reedy dedicated rocker lever and cam assembly operates according to the method described in the Vittorio '531 patent. The braking system includes an independent exhaust valve actuator assembly having a braking mode rocker lever and a cam lobe for imparting movement to the exhaust valve when the engine is operated in the braking mode.

The present invention is a significant improvement on this type of design. The present invention uses the dedicated cam lobe to effect two-cycle braking and exhaust gas recirculation, in order to provide additional retarding power from the engine. The above-described method and device do not anticipate two-cycle braking.

Sickler, U.S. Pat. No. 4,572,114 is one example of an early effort to develop a fully integrated, high performance, two-cycle compression release-type brake. Sickler's '114 patent discloses a process and apparatus for the compression release retarding of a multi-cylinder four cycle internal combustion engine. The process provides a compression release event for each cylinder during each revolution of the engine crankshaft in which the normal motion of the exhaust and intake valves is inhibited and the exhaust valves are opened briefly at each time the engine piston approaches the top dead center position. The intake valves are opened after each opening of the exhaust valves. The apparatus includes a hydraulic assembly driven by the engine push-tubes which produces a timed hydraulic pulse adapted to open the exhaust and intake valves at the proper time. Hydraulically actuated means are provided to disable the valve crosshead or rocker arm so as to inhibit the normal motion of the valves. The process and apparatus disclosed by Sickler is too involved and has not been commercially developed.

Another method that has been employed to attempt to achieve greater efficiency and performance from compression release engine braking systems is to attempt to achieve "two-cycle" engine braking. Essentially, the engine brake in a typical compression release-type engine retarder operates on only one stroke of a four-stroke engine, namely, at the end of the compression stroke near top dead center. It has long been theorized that greater braking performance could be achieved by attempting to initiate two compression release events per engine cycle during braking operation. Attempts have been made to do so but none of those attempts has yet to produce a commercially viable engine braking system that achieves increased performance. These devices, however, were too complicated with high manufacturing costs and low reliability. Furthermore, the others have not taken their development efforts far enough to develop technology for an engagement device for an overhead cam engine.

One of the principle limitations in achieving effective two-cycle engine braking occurs with a cam shaft operated valve train in a four-cycle engine. The normal exhaust valve motion must be disabled in order to retain the gases in the cylinder and achieve braking on a second stroke of the engine, when opening the exhaust valve before the second TDC which is the normal exhaust stroke TDC. Prior to this, new air has to be admitted to the cylinders before the second compression release event occurs. Otherwise, the air simply exits through the exhaust valve on the exhaust stroke. The ability to add a second cylinder fill event prior to the second braking event is also challenging. No prior engine braking systems of which the present inventors are aware have been able to overcome these two limitations and achieve an effective second braking event.

None of these methods, however, provide solutions to certain of the problems of compression release-type retarding. First, none of these prior systems disclose, teach, or suggest how to achieve reliable, effective two-cycle braking while actuating the valves, namely, without using a "bleeder" type brake. Second, none discloses, teaches, or suggests how to optimize the actuation of the exhaust valve during the intake and compression strokes in order to achieve the highest possible retarding horsepower from the compression release event without exceeding the mechanical limits of the engine. In addition, none of these methods discloses, teaches or suggests any method for the use of exhaust gas recirculation to regulate the exhaust pressure in the exhaust manifold least of all in the context of two-cycle braking.

Prior compression release-type brakes are typically optimized at the rated speed of the engine. The engine, however, is not always operated at its rated speed and, in fact, is frequently operated at significantly lower speeds. The advertised retarding performance based on the rated speed cannot be achieved when operating at lower engine speeds called mid range. It is therefore highly desirable to provide a method for controlling the braking systems and better tuning them to the speed at which the engine is operating. This is not possible with most prior methods, including those discussed above.

There remains a significant need for a method for controlling the actuation of the exhaust valves in order to increase the effectiveness of and optimize the compression release engine retarding. Further, there also remains a significant need for a system that is able to perform that function over a wide range of engine operating parameters and conditions. In particular, there remains a need to "tune" the compression release-type retarder system in order to optimize its performance at lower operating speeds than the rated speed of the engine.

In spite of the existence of the substantial incentives and prior work to develop effective two-cycle braking, none of the known efforts to do so have been successful. There remains a significant need for an effective two-cycle braking system that provides greater increased retarding power. In addition, providing effective two-cycle braking essentially requires assuming control of the valves from the valve train over a greater range of the engine braking cycle. There remains a significant need in the field for the invention to achieve this valve control. Again, however, in spite of the substantial need for these systems, no effective systems have been able to produce this valve control, let alone in both positive power and engine braking operation.

The present invention describes a process and apparatus that accomplishes both goals. It enables effective two-cycle braking to occur. The present invention is usable in multi-cylinder engines having one or more intake valves and one or more exhaust valves per cylinder. The present invention achieves essentially two-cycle engine braking and is capable of assuming control of valve actuation in both positive power and engine braking operation.

OBJECTS OF THE INVENTION

It is therefore an object of the present invention to provide effective two-cycle braking.

Another object of the present invention is to provide greater valve control through a broader range of crank angle of valve motion than prior known systems.

A further object of the present invention is to enable a second filling operation to occur in a four-stroke engine after top dead center compression during what would otherwise be the power stroke.

Yet another object of the present invention is to provide a mechanism for disabling normal exhaust valve motion in order to engage a second compression release type braking event during the engine cycle.

Yet another object of the present invention is to provide a full authority valve control system to enable the engine to assume a greater range of control over the actuation of the valves than is available with present systems.

A yet additional object of the present invention is to provide a full authority valve actuation system that is usable on both positive power and in braking operation through the same apparatus.

An additional object of the present invention is to provide a valve actuation and control system that is reliable and robust throughout the entire range of engine braking and power operation.

Another object of the invention is to eliminate the need to set a lash manually for the brake by using automatic lash adjusters.

It is another object of the present invention to provide automatic lash adjusters for positive power.

It is yet another object of the invention to more deeply integrate the engine brake design with the design of other engine overhead components.

It is another object of the present invention to provide effective second cycle internal combustion engine braking.

It is another object of the present invention to provide a controlled intake and exhaust valve actuating system for both engine braking and positive power operating modes.

It is another object of the present invention to provide a controlled two-cycle braking system that is reliable and robust over the entire operating range of the engine speeds.

It is another object of the present invention to provide an apparatus that is capable of providing a second engine braking cycle.

A further object of the present invention is to integrate the compression release-type brake components more fully with the balance of the engine overhead design to secure greater control and reliability and develop a more complete "full authority" valve actuation system.

SUMMARY OF THE INVENTION

In response to this challenge, the inventors of the present invention have developed an innovative and reliable system and apparatus to achieve multi-cycle valve actuation in both engine braking and positive power applications.

The innovative system achieves the objectives, and performs the aforementioned functions by replacing a dual overhead cam internal combustion engine's conventional intake and exhaust valve actuating system with a controlled valve actuating system. The innovative system is specifically applicable to dual overhead cam equipped engines wherein one camshaft actuates the intake and exhaust valves and the second camshaft actuates the fuel injectors. In such equipped engines there is sufficient room on the valve camshaft to add the brake rocker arm actuating cam, as well as sufficient room on the head deck and rocker arm shaft to accommodate the new brake rocker arm.

The present invention is directed to an apparatus for performing multi-cycle engine braking. The apparatus includes means for operating at least one exhaust valve of an engine cylinder during positive power engine operation. The apparatus according to the present invention also includes means for operating at least one intake valve of the engine cylinder, and means for operating at least one exhaust valve of the engine cylinder during an engine braking operation.

The means for operating at least one exhaust valve during the positive power engine operation includes an exhaust rocker arm that is operated by a exhaust rocker arm cam. The exhaust rocker arm cam may be provided on an overhead cam shaft of an engine.

The means for operating at least one exhaust valve during the positive power engine operation includes exhaust valve engaging means for engaging the at least one exhaust valve to effectuate operation of the at least one exhaust valve. The exhaust valve engaging means releasably engages a pin in the crosshead of the at least one exhaust valve. The exhaust valve engaging means preferably includes a lash adjusting assembly. The lash adjusting assembly preferably is hydraulically operated. According to the present invention, the means for operating the at least one exhaust valve alters the at least one exhaust valve normal operation during the engine braking operation.

The means for operating the at least one intake valve operates the at least one intake valve during the positive power engine operation. The means for operating the at least one intake valve delays the operation of the at least one intake valve during the engine braking operation. The means for operating the least one intake valve includes an intake rocker arm that is operated by an intake rocker arm cam. The intake rocker arm cam may be provided on an overhead cam shaft of an engine.

The means for operating the least one intake valve includes intake valve engaging means for engaging the at least one intake valve to effectuate operation of the at least one intake valve during the positive power engine operation. The intake valve engaging means releasably engages a crosshead operating at least two intake valves. The intake valve engaging means delays operation of the at least one intake valve during an engine braking operation. The intake valve engaging means comprises a lash adjusting assembly. The lash adjusting assembly is preferably hydraulically operated. The lash adjusting assembly preferably retracts to a braking position during the engine braking operation such that the operation of the at least one intake valve is delayed.

The means for operating the at least one exhaust valve of the engine cylinder during the engine braking operation accomplishes at least one braking operation for the at least one exhaust valve during an engine cycle. The means for operating the at least one exhaust valve of the engine cylinder during the engine braking operation includes a brake rocker arm that is operated by a brake cam lobe. The brake cam lobe may be provided on an overhead cam shaft of an engine. The brake rocker arm engages a crosshead pin for the at least one exhaust valve during the at least one engine braking operation. The brake rocker arm disengages the crosshead pin during the positive power engine operation.

The means for operating the at least one exhaust valve of the engine cylinder during the engine braking operation accomplishes two braking operations for the at least one exhaust valve during an engine cycle.

The means for operating the at least one exhaust valve of the engine cylinder during the engine braking operation includes means to accomplish an exhaust gas recirculation event.

The present invention is also directed to a method of performing multi-cycle engine braking. The method includes the steps of performing a first compression release event, performing a second compression release event, and opening at least one intake valve. The method further includes a step of performing an exhaust gas recirculation event preferably occurs at the conclusion of said first compression release event. The step of performing the first compression release event may include the steps of opening at least one exhaust valve to effectuate engine braking, and closing the at least one exhaust valve after predetermined time. The step of opening at least one exhaust valve to effectuate engine braking may be initiated prior to compression top dead center. The step performing the second compression release event may include the steps of opening at least one exhaust valve to effectuate engine braking, and closing the at least one exhaust valve after predetermined time. The step of opening at least one exhaust valve to effectuate engine braking is preferably initiated prior to exhaust top dead center. The step of opening at least one intake valve preferably in the vicinity after exhaust top dead center.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

The present invention will now be described in connection with the following figures in which like reference numbers refer to like elements and wherein:

FIG. 3 is a graph of crank angle (in degrees) versus valve lift (in inches) for the two-cycle braking process and apparatus of the present invention and engine piston motion;

FIG. 4 is a plan schematic view illustrating the [dual cam] *rocker arm* arrangement and dedicated brake rocker for a compression release-type engine brake according to the present invention;

[FIG. 5 is an overhead view of an exhaust rocker arm according to the present invention;]

FIG. 6 is a cross-sectional view of [the exhaust] *a common* rocker shaft [of FIG. 5 along section line I—I] *and a solenoid valve according to one embodiment of the present invention*;

FIG. 7 is a partial cross-sectional view of [the] *an* exhaust rocker arm [of FIG. 5 along section lines II—II and III—III] *according to one embodiment of the present invention*;

FIG. 8 is [a partial cross-sectional] *an overhead* view of [the] *an* exhaust rocker arm [of FIG. 7 along section line IV—IV,] *according to one embodiment of the present invention;*

[FIG. 9 is an enlarged cross-section view of a lash adjuster for use on the exhaust rocker arm of FIG. 5;]

[FIG. 10 is an overhead view of an intake rocker arm according to the present invention;]

FIG. 11 is a partial cross-sectional view of [the] *an* intake rocker arm [of FIG. 10 along section lines V—V and VI—VI] *according to one embodiment of the present invention*;

FIG. 12 is a cross-sectional view of [the] *an* intake rocker arm [of FIG. 11 along section line VII—VII] *according to one embodiment of the present invention*;

[FIG. 13 is an overhead view of a brake rocker arm according to the present invention;]

FIG. 14 is a partial cross-sectional view of [the] *a* brake rocker arm [of FIG. 13 along section line VIII—VIII] *according to one embodiment of the present invention*;

[FIG. 15 is a partial cross-sectional view of the brake rocker arm of FIG. 14 along section line IX—IX;]

[FIG. 16 is a side view of an exhaust rocker arm according to an alternate embodiment of the present invention;]

[FIG. 17 is a side view of an intake rocker arm according to an alternate embodiment of the present invention; and]

FIG. 18 is a plan schematic view of the cam arrangement and dedicated rocker for a compression release-type engine brake according to a preferred embodiment of the present invention.

*FIG. 19 is an enlarged cross-section view of a lash adjuster according to one embodiment of the present invention;*

*FIG. 20 is a side view of an exhaust rocker arm according to an alternate embodiment of the present invention; and*

*FIG. 21 is a side view of an intake rocker arm according to an alternate embodiment of the present invention.*

DETAILED DESCRIPTION OF THE INVENTION

Figure 1:
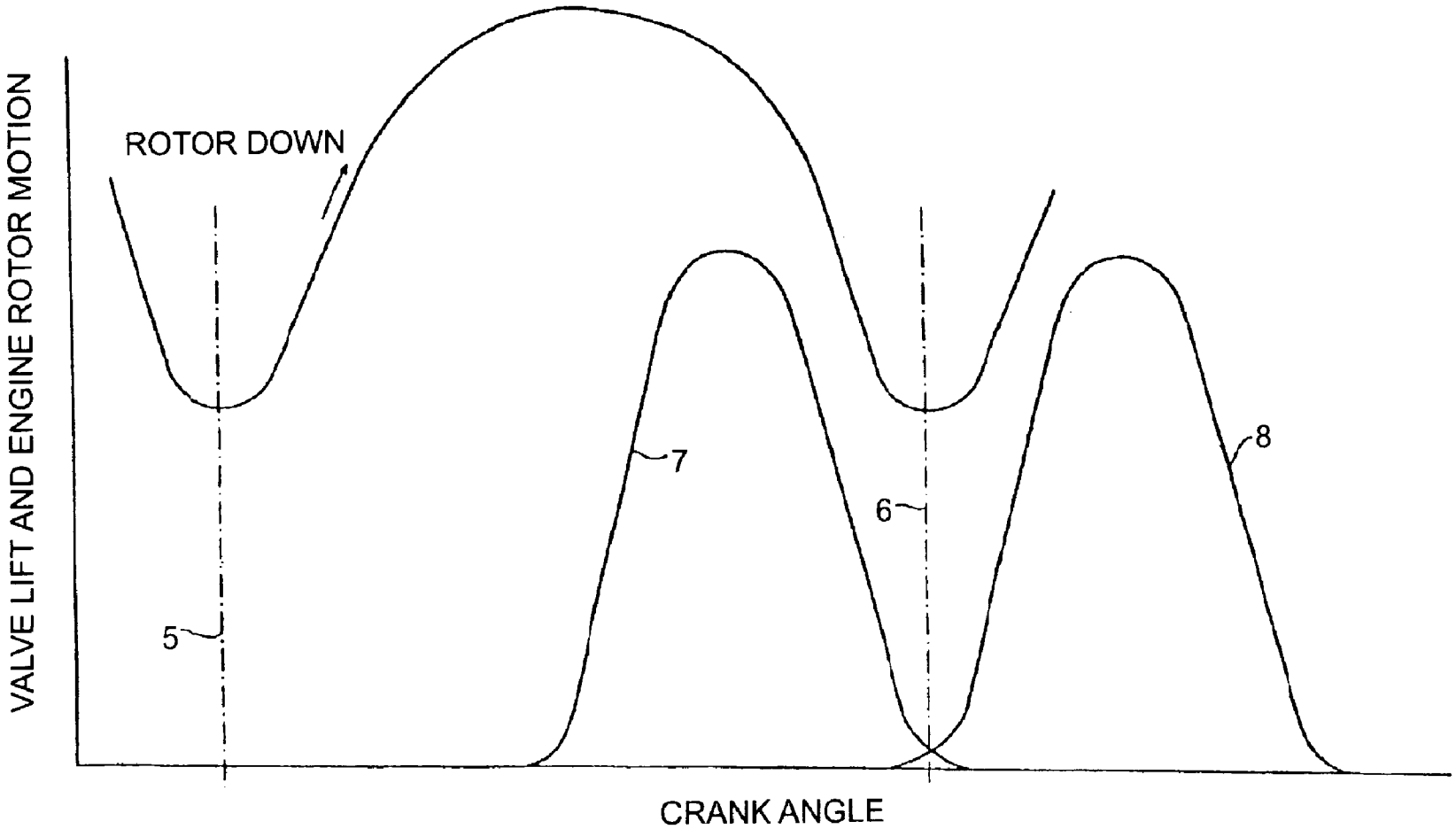
FIG. 1 PRIOR ART
FIG. 1 is a graph of crank angle (in degrees) versus valve lift (in inches), depicting a positive power curve typical of the prior art and engine piston motion.
Figure 2:
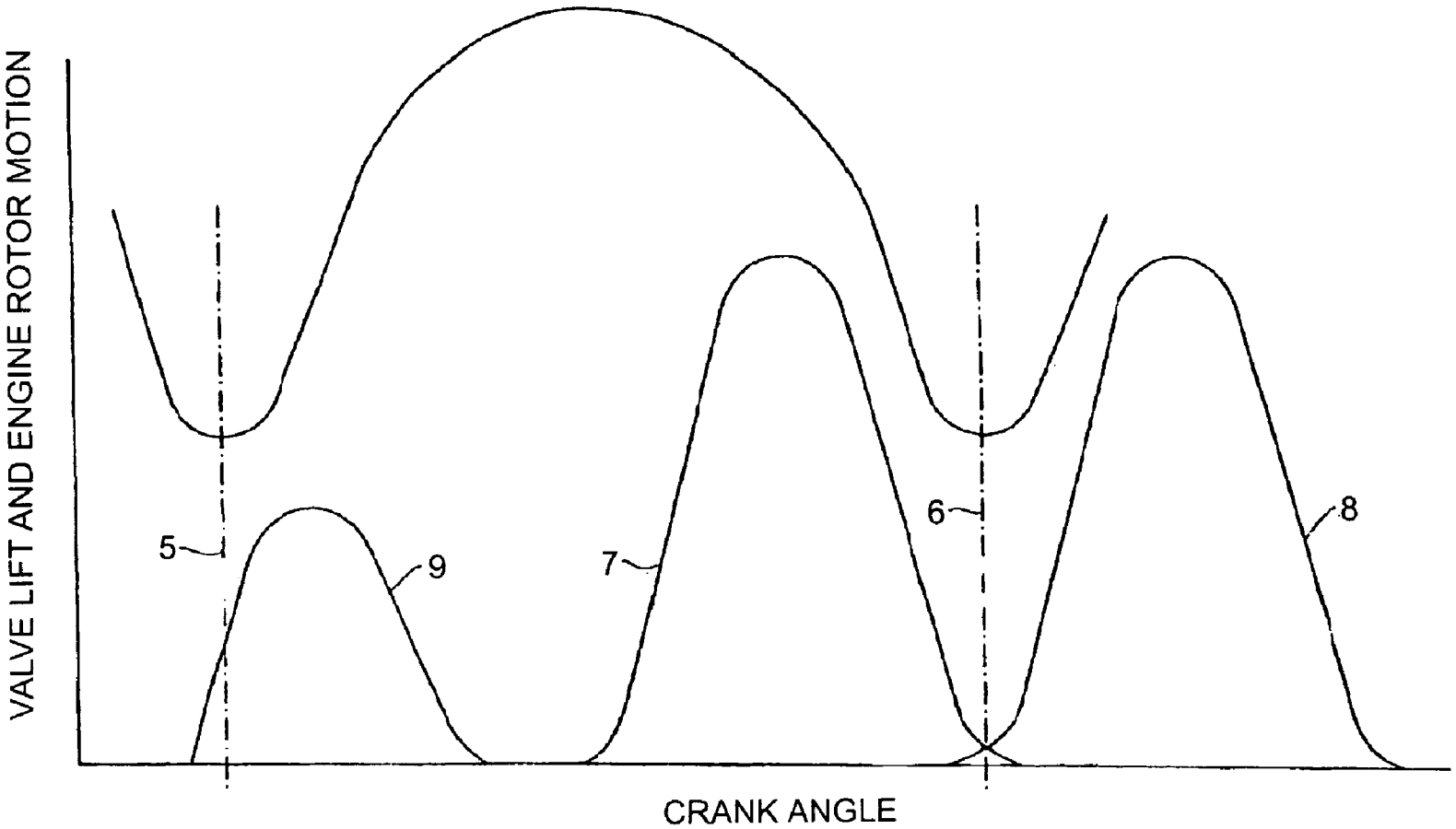
FIG. 2 PRIOR ART
FIG. 2 is a graph of crank angle (in degrees) versus valve lift (in inches) of a conventional engine brake, representative of the prior art and engine piston motion.

Reference will now be made in detail to a preferred embodiment of the present invention, an example of which is illustrated in the accompanying drawings. FIG. 4 and FIG. 18 illustrate a schematic view of the valve side of [dual cam shaft] *a rocker arm* arrangement and dedicated brake cam rocker for a compression release-type engine brake assembly 10 according to the present invention. The compression release engine brake components and the valve actuation components are located in rocker arms 100, 200, and 300.

The rocker arms 100, 200, and 300 are spaced along a common rocker shaft 11 having at least one passage. The common rocker shaft 11 has a passage 12 through which a supply of engine oil flows therethrough, as shown in FIG. [5] *6*. The common rocker shaft 11 also has a supply passage 13 which supplies hydraulic fluid to an exhaust rocker arm 100 and an intake rocker arm 200. A valve 30 is located on the common rocker shaft 11, as shown in FIG. [5] *6*. The valve 30 is preferably a normally open solenoid valve, as shown in FIG. 6. It, however, is contemplated by the inventors of the present invention that other suitable valves may be substituted and are considered to be within the scope of the present invention. The valve 30 includes a connector assembly 31 for electrically connecting the valve 30 to a vehicle voltage source[, not shown]. The valve 30 when in an open position permits the flow of hydraulic fluid from passage 12 to supply passage 13. The rocker arms 100, 200 and 300 correspond to a cam shaft 20 having three spaced cam lobes 21, 22, and 23. Exhaust cam lobe 21 corresponds to an exhaust rocker arm 100, *as shown in FIG. 7*. Intake cam lobe 22 corresponds to an intake rocker arm 200, *as shown in FIG. 11*. Brake cam lobe 23 corresponds to a brake rocker arm 300, *as shown in FIG. 14*. The exhaust cam lobe 21 and the intake cam lobe 22 are oriented and timed to effect normal valve operation, as in a typical four-stroke internal combustion engine, of the type known in the prior art.

The brake cam lobe 23 includes a first compression release lobe. In a preferred embodiment, *as shown in FIG. 3*, the [profile of the lobe starts at about 35°. The] first compression release [lobe] *event 1* is timed to start *at* about 40° before compression top dead center (TDC), then reach maximum opening around compression top dead center. [Then] *The first compression release event is timed to then* start closing after compression top dead center, staying partially open for a period, *as shown by the exhaust gas recirculation event 2,* and then closing around bottom dead center[, and finish just after compression TDC]. A second [lobe] *compression release event 3* is timed to start about [1000 after compression TDC] *40° before exhaust TDC* and finish by [200°] *70°* after [compression] *exhaust* TDC.

Means for effecting exhaust valve operation will now be described in connection with FIGS. [5–9] *7 and 8*. The means includes an exhaust rocker arm 100 that is rotatably mounted on the common rocker shaft 11. A first end of the exhaust rocker arm 100 includes an exhaust cam lobe follower 110. The exhaust cam lobe follower 110 preferably includes a roller follower 111 that is in contact with the exhaust can lobe 21.

A second end of the exhaust rocker arm 100 has a lash adjuster 120. The lash adjuster 120 is adjacent to a crosshead 130. The lash adjuster 120 is described in detail below. The crosshead 130 is preferably a bridge device that is capable of opening two exhaust valves simultaneously. The exhaust rocker arm 100 also includes a control valve 140 that includes a spring ball assembly 141, *as shown in FIG. 8*. The control valve 140 is in communication with a fluid passageway 150 that extends through the exhaust rocker arm 100 to the lash adjuster 120. The control valve 140 is also in communication with a fluid passageway 160 that extends between the control valve 140 and supply passage 13 of the common rocker shaft 11, *as shown in FIG. 7*.

The passage 12 is connected to passage 14 which supplies hydraulic fluid to provide lubrication between the exhaust rocker arm 100 and the common rocker shaft 11. The passage 14 also supplies lubricant through passage 15 to the exhaust cam lobe follower 110 such that the *exhaust* roller follower 111 [smoothly follows cam 21] *is lubricated*.

Means for effecting intake valve operation will now be described in connection with FIGS. [10–12] *11 and 12*. The means includes an intake rocker arm 200 that is rotatably mounted on the common rocker shaft 11. A first end of the intake rocker arm 200 may include an intake cam lobe follower *210*, as described above in connection with exhaust rocker arm 100. The *intake roller follower 211 of the* intake cam lobe follower 210 is in contact with the intake cam lobe 22. However, it is contemplated that other cam followers[, such as, for example, a roller follower] are considered to be within the scope of the present invention.

A second end of the intake rocker arm 200 has a lash adjuster 220. The lash adjuster 220 has the same design as the lash adjuster 120 described above in connection with the exhaust[er] rocker arm 100. The lash adjuster 220 is adjacent to a crosshead 230. The lash adjuster 220 is described in detail below. The crosshead 230 is also preferably a bridge device that is capable of opening two intake valves simultaneously. The intake rocker arm 200 also includes a control valve 240. The control valve 240 is in communication with a fluid passageway 250 that extends through the exhaust rocker arm 200 to the lash adjuster 220, *as shown in FIG. 12*. The control valve 240 has the same construction as the control valve 140 described above in connection with the exhaust rocker arm 100. The control valve 240 is also in communication with a fluid passageway 260 that extends between the control valve 240 and supply passage 13 of the common rocker shaft 11, *as shown in FIG. 11*.

The passage 12 is connected to passage [15] *16* which supplies hydraulic fluid to provide lubrication between the [exhaust] *intake* rocker arm 200 and the common rocker shaft 11. The passage [14] *16* also supplies lubricant through passage [17] *25* to the [exhaust] *intake* cam lobe follower 210 such that the *intake* roller follower 211 [smoothly follows cam 22] *is lubricated*. Alternatively, the common rocker shaft 11 may be provided with a third passage 18, as shown in FIG. 18. The third passage 18 supplies lubricant to the cam [following] *lobe followers* 110, 210 and 310.

Means for effecting two cycle engine braking will now be described in connection with [FIGS. 13–15] *FIG. 14*. The means includes a brake rocker arm 300 that is rotatably mounted on the common rocker shaft 11. A first end of the brake rocker arm 300 includes a brake cam lobe follower 310. The brake cam lobe follower 310 preferably includes a roller follower 311 that is in contact with the brake cam lobe 31.

A second end of the brake rocker arm 300 has an actuator piston 320. The actuator piston 320 is spaced from *the*

*crosshead pin 133 of* the crosshead 130 [of the exhaust rocker arm 100]. When activated, [the brake rocker arm 300 and] the actuator piston 320 contacts the crosshead pin 133 of the crosshead 130 to open the at least one exhaust valve. The brake rocker arm 300 also includes a combination control valve/solenoid valve 340. The valve 340 is in communication with a fluid passageway 350 that extends through the brake rocker arm 300 to the actuator piston 320, *as shown in FIG. 14*. The valve 340 is also in communication with a fluid passageway 360 that extends between the valve 340 and passage 12 of the common rocker shaft 11. The valve 340 [is] preferably includes an electronically operated solenoid valve *344*. The valve 340 includes a connector assembly 341 for electrically connecting the [control] *solenoid* valve *344* to a vehicle—which supplies voltage at the proper time.

The above-described brake rocker arm 300 includes [a] *the* valve 340 [including a solenoid valve] mounted [on the rocker arm 300] *thereon*. It is contemplated and preferred by the inventors of the present invention that *the solenoid valve 344 of* the valve 340 may be relocated to the common rocker shaft 11. As shown in FIG. 18, solenoid valve 344 is located on the common rocker shaft 11. With this arrangement, any difficulties with electrically connecting the valve to the vehicle are avoided because the solenoid valve *344* would not rotate with the rocker arm. The *brake* rocker arm 300 would include a control valve 342 therein similar to control valves 140 and 240, described above. Hydraulic fluid would then be fed to the rocker arm 300 through the solenoid valve 344 on the common rocker shaft 11 to the control valve *342* on the rocker arm to operate the actuator [portion] *piston* 320.

As shown in FIG. 18, hydraulic fluid is supplied to the system 10 by a pumping assembly 7000 or other suitable assembly for supplying pressurized fluid. The pumping assembly 7000 is preferably connected to a hydraulic fluid source 8000, such as, for example, an engine oil pan.

The brake rocker arm 300 preferably interacts with a spring assembly attached to the common rocker shaft 11. The spring assembly engages the brake rocker arm 300 to return the rocker arm 300 to a rest position when the rocker arm 300 is not in use (i.e., during positive power).

The lash adjuster 120 will now be described in connection with FIG. [9] *19*. The lash adjuster 120 is mounted in the second end of the exhaust rocker arm 100, as shown in FIG. [9] *19*. The lash adjuster 120 includes an inner plunger 121 and an outer plunger 122. The outer plunger 122 includes a ring 1221 that is positioned within groove 170 within the exhaust rocker arm 100, as shown in FIG. [9] *19*. The inner plunger 121 as slidably received within the outer plunger 122. In operation, hydraulic fluid flows into a cavity 1211 in the inner plunger 121. As the cavity 1211 fills with fluid, the check ball valve 1213 is biased downwardly to open aperture 1210 in the inner plunger 121. Hydraulic fluid then flows into cavity 1222 [in] *between* the outer plunger *122 and the inner plunger 121*. As the cavity 1222 is filled with fluid, the outer [piston 121] *plunger 122* moves downward to an extended position to engage crosshead [pin] 130. The downward movement of the outer [piston 121] *plunger 122* is limited by the ring 1221 engaging the lower surface of groove 170.

The lash adjuster 220 has a similar construction to the lash adjuster 120, described above. The lash adjuster 220 includes an additional assembly to limit the upward travel of the outer plunger 222. This expands the lash between the rocker arm 200 and the crosshead 230. This permits the delayed opening of the intake valves when the lash adjuster 220 is in a retracted position.

It, however, is contemplated by the inventors of the present invention that other suitable lash adjusters including, but not limited to, electronically operated lash adjusters and mechanically operated adjusters may be substituted for the above described hydraulic lash adjuster. These variations and modifications are considered to be within the scope of the present invention.

FIG. 3 depicts the exhaust valve opening and remaining open for optimum engine braking. *As shown in* FIG. 3, *the motion* begins [at the] *before the* TDC of the first compression stroke. Additionally, the extended plateaus shown during which the exhaust valve remains open but with a reduced valve opening, permits drawing exhaust gas from the exhaust manifold into the cylinder as the piston travels away from the cylinder head. The exhaust valve closes and the entrapped exhaust gas is compressed and then released providing a second engine braking cycle *3*. [Subsequently, the intake valve opens, air is drawn into the cylinder and compressed and then released providing a first engine braking cycle. Subsequently, the intake valve opens, air is drawn into the cylinder and compressed repeating the two-cycle braking.] *The motion of the intake valve will now be described.* The intake valve's opening *4* is modified (from its positive power timing *8*) to occur after TDC of the second braking cycle *3* to insure the compressed exhaust gas is not vented into the intake manifold.

Operation During Positive Power

The operation of the exhaust rocker arm 100 will now be described during positive power operation. During positive power, the [control] valve 30 is opened. The [control] valve 30 is preferably a normally open three way solenoid valve. The solenoid valve 30 permits the flow of hydraulic fluid from passage 12 to supply passage 13. Fluid then flows through passageway 160 to control valve 140. The spring ball assembly 141 of the control valve 140 is unseated to allow hydraulic fluid to flow through passageway 150 to lash adjuster 120. The lash adjuster 120 is extended to a fully extended normal operating position such that the lash adjuster 120 is in contact with the crosshead 130. When pressure within the control valve 140, specifically the spring ball assembly 141 equalizes a hydraulic lock forms which allows the lash adjuster 120 to remain in an extended position. Accordingly, the exhaust rocker arm 100 will activate exhaust valve openings in response to exhaust cam lobe 21.

The operation of the intake rocker arm 200 during positive power operation will now be described. As described above in connection with the exhaust rocker arm 100, the solenoid valve 30 is in an open position. The [spring ball assembly 241 of] solenoid valve 30 permits the flow of hydraulic fluid from passage 12 to supply passage 13. Fluid then flows through passageway 260 to control valve 240. The *spring ball assembly 241 of the* control valve 240 is unseated to allow hydraulic fluid to flow through passageway 250 to lash adjuster 220. The lash adjuster 220 is extended to a fully extended normal operating position such that the lash adjuster 220 is in contact with the crosshead 230. The control valve 240 operates in a similar manner to control valve 140, described above, to form a hydraulic lock that allows the lash adjuster 220 to remain in an extended position. Accordingly, the intake rocker arm 200 will actuate intake valve openings in response to intake cam lobe 22.

The operation of the brake rocker arm 300 during positive power operation will now be described. The [solenoid] valve 340 is closed. During positive power the solenoid valve *344 of the valve* 340 remains closed. Accordingly, the actuator piston 320 remains in a [seated] *retracted* position, as shown in [FIGS. 14 and 15] *FIG. 14*. The brake rocker arm 300 will remain in a disabled position during positive power.

Operation of Intake and Exhaust Rocker Arms During Braking

The operation of the exhaust rocker arm 100 will now be described during an engine braking operation. During engine braking, the solenoid valve 30 is operated to stop the flow of hydraulic fluid through passage 13. The control valve 140 is [opened] *in the off position*. This permits the hydraulic fluid trapped within passageway 150, as described above in connection with the positive power operation to be vented[. The spring ball assembly 141 prevents], *preventing* the additional supply of hydraulic fluid to passageway 150. This causes the lash adjuster 120 to retract. As a result, exhaust valve openings cease during the engine braking operation. A spring, not shown, may be provided to prevent vibration and chatter of the exhaust rocker arm 100 when in the above described disabled position.

The operation of the intake rocker arm 200 will now be described during an engine braking operation. During engine braking, the solenoid valve 30 is operated to stop the flow of hydraulic fluid through passage 12, as described above. A control valve 240 is operated to vent the hydraulic fluid in a similar manner as described above in connection with the exhaust rocker arm 100. The preset stop of the lash adjuster 220 prevents the lash adjuster 220 from fully retracting. Accordingly, the intake rocker arm 200 is not fully disabled during the engine braking operation. The total cam lift of the intake cam lobe 22 is not transferred into valve lift. This has the effect of delaying the time event to occur after exhaust top dead center. The opening of the intake valve is delayed due to the partially retracted position of lash adjuster 220. The opening is delayed until the cylinder is vented through the open exhaust valve immediately following the second compression braking cycle *3*, as shown in FIG. 3.

The operation of the brake rocker arm 300 during an engine braking operation will now be described. During engine braking, the [solenoid] valve 340 is operated. Hydraulic fluid is permitted to flow from passage 12 through passageway 360 to passageway 350. The actuator piston 320 then extends to a fully extended position such that it contacts pin 133 on crosshead 130. When the passageway 350 is filled with hydraulic fluid and the pressure is equalized within valve 340, a hydraulic lock is formed thus holding the actuator piston 320 in an extended position. The operation of the exhaust valve is now controlled by the brake rocker arm 300 in response to actuation by the brake cam lobe 23. The operation of the exhaust valves will occur in response to the profile of the brake cam lobe 23.

The brake cam lobe 23 also preferably has an exhaust gas recirculation lobe that occurs after the first braking event. This exhaust gas recirculation lobe on cam profile is disposed so that exhaust gas recirculation occurs after the first braking event, as shown in FIG. 3. Preferably, this allows the valves to remain open, which in turn allows exhaust gases to flow into the cylinder on the power stroke, charging the cylinder prior to the second braking event. The brake cam lobe 23 once again lifts the rocker arm just before exhaust top dead center, permitting a second braking event as shown in FIG. 3.

Effective two-cycle engine braking may be achieved in accordance with the present invention. The operating sequence of events will now be described. A first compression release cycle or braking event 1 is initiated just prior to compression top dead center, as shown in FIG. 3. The exhaust valve is then reset by partially closing the exhaust valve. The partial closing of the exhaust valve permits the recharging of the cylinder through an exhaust gas recirculation event 2, as shown in FIG. 3. The exhaust valve is then completely closed at the completion of the exhaust gas recirculation event. During this engine operating sequence, the normal operation of the exhaust valve by the exhaust rocker 100 is disabled. The operation of the at least one exhaust valve is controlled by the brake rocker arm 300. The profile of the brake cam lobe 23 initiates the first braking event 1 and causes the at least one exhaust valve to remain partially open during the exhaust gas recirculation event 2.

A second compression release cycle or braking event 3 is initiated just prior to exhaust top dead center, as shown in FIG. 3. The profile of the brake cam lobe 23 initiates the opening and closing of the at least one exhaust valve during the second braking event 3. The opening event 4 of the at least one intake valve is delayed past the exhaust top dead center, as shown in FIG. 3. The delayed intake valve opening prevents the valve to open when high cylinder pressure is present.

Alternate Embodiments

Continuing with the embodiments in the accompanying figures, FIG. [16] *20* is an alternative embodiment for the means for effecting exhaust valve operation. The exhaust rocker arm 1000 is rotatably mounted on the common rocker shaft 11. A first end of the exhaust rocker arm 1000 includes an exhaust cam lobe follower [110] *111*.

A second end of the exhaust rocker arm 1000 has a lash adjuster 120. The lash adjuster 120 is connected adjacent to a crosshead 130. The crosshead 130 is preferably a bridge device that is capable of opening two valves simultaneously. The exhaust rocker arm 1000 also includes a *combination control valve/*solenoid valve 1400. The [solenoid control] valve 1400 is in communication with a fluid passageway 150 that extends through the exhaust rocker arm 100 to the lash adjuster 120. The [solenoid control] valve 1400 is also in communication with a fluid passageway [160] *16* that extends between the [solenoid] valve [140] *1400* and supply passage 13 of the common rocker shaft 11. The [solenoid] valve 1400 combines the *solenoid* valve 30 and the [solenoid ] *control* valve 140 into a single assembly.

FIG. [17] *21* is an alternative embodiment for the means for effecting intake valve operation. The intake rocker arm 2000 is rotatably mounted on the common rocker shaft 11. A second end of intake rocker arm 2000 has a lash adjuster 220. The intake rocker arm 2000 also includes a *combination control valve/*solenoid valve 2400. The [solenoid] valve 2400 is in communication with a fluid passageway 250 that extends through the exhaust rocker arm 2000 to the lash adjuster 220. The solenoid valve 2400 has the same construction as the [solenoid] valve 1400 described above in connection with the exhaust rocker arm 1000.

The intake rocker arm 2000 and the exhaust rocker arm 1000 operate in substantially the same manner as the intake rocker arm 200 and the exhaust rocker arm 100. In this embodiment, the solenoid valve 30 is eliminated.

It will be apparent to those skilled in the arts that various modifications and variations can be made in the construction and configuration of the present invention, without departing from the scope or spirit of the invention. Several variations have been discussed in the preceding text. Furthermore, it is contemplated that the present invention may be used with a common rail camless type engine whereby the above described [rocker arms] *engine valves* may be electronically operated. Others will be apparent to persons of ordinary skills in the art. It is intended that the present invention cover the modifications and variations of the invention, provided they come within the scope of the appended claims and their equivalence.

We claim:

1. An apparatus for performing multi-cycle engine braking, said apparatus comprising:

exhaust valve operating means for operating at least one exhaust valve of an engine cylinder during a positive power engine operation;

intake valve operating means for operating at least one intake valve of the engine cylinder; and braking means for operating the at least one exhaust valve of the engine cylinder during an engine braking operation, wherein said braking means accomplishes at least two braking operations for the at least one exhaust valve per engine cycle during the engine braking operation, wherein said intake valve operating means delays the operation of the at least one intake valve during the engine braking operation.

2. The apparatus according to claim 1, wherein said means for operating the at least one exhaust valve during the positive power engine operation includes an exhaust rocker arm.

3. The apparatus according to claim 1, wherein said exhaust valve operating means includes exhaust valve engaging means for engaging the at least one exhaust valve to effectuate operation of the at least one exhaust valve.

4. The apparatus according to claim 3, wherein said exhaust valve engaging means releasably engages a crosshead pin of the at least one exhaust valve.

5. The apparatus according to claim 3, wherein said exhaust valve engaging means comprises a lash adjusting assembly.

6. The apparatus according to claim 5, wherein said lash adjusting assembly is hydraulically operated.

7. The apparatus according to claim 1, wherein said exhaust valve operating means disengages the at least one exhaust valve during the engine braking operation.

8. The apparatus according to claim 1, wherein said intake valve operating means operates the at least one intake valve during the positive power engine operation.

9. The apparatus according to claim 1 wherein said intake valve operating means includes an intake rocker arm.

10. The apparatus according to claim 8, wherein said intake valve operating means includes intake valve engaging means for engaging the at least one intake valve to effectuate operation of the at least one intake valve during the positive power engine operation.

11. The apparatus according to claim 10, wherein said intake valve engaging means releasably engages a crosshead pin of the at least one intake valve.

12. The apparatus according to claim 10, wherein said intake valve engaging means comprises a lash adjusting assembly.

13. The apparatus according to claim 12, wherein said lash adjusting assembly is hydraulically operated.

14. The apparatus according to claim 12, wherein said lash adjusting assembly retracts to a braking position during the engine braking operation such that the operation of the at least one intake valve is delayed.

15. The apparatus according to claim 1, wherein said means for operating the at least one exhaust valve of the engine cylinder during the engine braking operation includes a brake rocker arm.

16. The apparatus according to claim 1, wherein said brake rocker arm engages a crosshead pin for the at least one exhaust valve during the at least two engine braking operation.

17. The apparatus according to claim 16, wherein said brake rocker arm disengages the crosshead pin during the positive power engine operation.

18. The apparatus according to claim 1, wherein said braking means includes means to accomplish an exhaust gas recirculation event.

19. A method of performing multi-cycle engine braking, said method comprising the steps of:

performing a first compression release event, wherein said first compression release event includes the steps of opening at least one exhaust valve to effectuate engine braking and closing the at least one exhaust valve after predetermined time, wherein said step of opening the at least one exhaust valve to effectuate engine braking during said first compression release event is initiated prior to compression top dead center;

performing a second compression release event, wherein said second compression release event includes opening the at least one exhaust valve to effectuate engine braking, and closing the at least one exhaust valve after predetermined time, wherein said step of opening the at least one exhaust valve to effectuate engine braking during said second compression release event is initiated prior to exhaust top dead center; and dealing the opening of at least one intake valve for a predetermined time during engine braking.

20. The method according to claim 19, further comprising the step of:

performing an exhaust gas recirculation event at the conclusion of said first compression release event.

21. The method according to claim 19, wherein said step of opening at least one intake valve occurs after exhaust top dead center.

*22. An assembly for operating an engine valve comprising:*

*a rocker shaft;*

*a rocker arm pivotally mounted on said rocker shaft, said rocker arm including a cavity at a valve actuation end;*

*an hydraulic lash adjuster slidably disposed in the rocker arm cavity;*

*an hydraulic passage provided in the rocker arm, said passage communicating with the rocker arm cavity; and*

*means for (a) selectively supplying hydraulic fluid to the passage during a positive power mode of engine operation and (b) venting hydraulic fluid from the passage during an engine braking mode of engine operation, wherein the engine braking mode comprises at least two braking operations.*

*23. The assembly of claim 22, wherein said hydraulic lash adjuster comprises:*

*an outer plunger slidably received in the cavity; and*

*an inner plunger slidably received in the outer plunger.*

*24. The assembly of claim 22, wherein said means for supplying and cutting off supply comprises a normally open three-way solenoid valve.*

*25. The assembly of claim 22, wherein said means for supplying and cutting off supply is mounted on said rocker shaft.*

*26. The assembly of claim 22, wherein said means for supplying and cutting off supply provides hydraulic fluid flow control for a plurality of lash adjusters.*

*27. A method of operating an engine valve lash adjuster in an internal combustion engine comprising the steps of:*

*determining that an engine is operating in a positive power mode;*

*selectively supplying hydraulic fluid to a lash adjuster in response to a determination that the engine is operating in a positive power mode of operation;*

*determining that the engine is operating in an engine braking mode; and*

*venting hydraulic fluid from the lash adjuster in response to a determination that the engine is operating in an engine braking mode of operation, wherein the engine braking mode comprises at least two braking operations.*

*28. An engine valve actuation system for positive power mode and compression brake mode engine operation, said system comprising:*

*a first rocker arm positioned to selectively actuate one or more valves associated with an engine cylinder;*

*a first hydraulic lash adjuster operatively contacting the first rocker arm, said first hydraulic lash adjuster being adapted to provide more lash during compression brake operation than during positive power operation;*

*a second rocker arm positioned to selectively actuate at least one of the one or more valves associated with the engine cylinder; and*

*a second hydraulic lash adjuster operatively contacting the second rocker arm, said second hydraulic lash adjuster being adapted to provide more lash during positive power operation than during compression brake operation,*

*wherein the compression brake operation comprises a first compression release event and a second compression release event.*

*29. The system of claim 28 wherein the first rocker arm is an exhaust rocker arm, and wherein the second rocker arm is a brake rocker arm.*

*30. The system of claim 28 wherein the first rocker arm is an intake rocker arm, and wherein the second rocker arm is a brake rocker arm.*

*31. The system of claim 28 further comprising a brake cam in operative contact with the second rocker arm, said brake cam having at least two compression-release lobes adapted to provide two-cycle engine brake operation.*

*32. The system of claim 28 wherein the first hydraulic lash adjuster extends out of an end of the first rocker arm.*

*33. The system of claim 32 wherein the second hydraulic lash adjuster extends out of an end of the second rocker arm.*

*34. The system of claim 28 further comprising:*

*a third rocker arm positioned to selectively actuate one or more additional valves associated with the engine cylinder; and*

*a third hydraulic lash adjuster operatively contacting the third rocker arm, said third hydraulic lash adjuster being adapted to provide more lash during compression brake operation than during positive power operation.*

*35. The system of claim 34 wherein the third rocker arm is an intake rocker arm.*

*36. The system of claim 34 further comprising a shared hydraulic supply circuit for the first hydraulic actuator and the third hydraulic actuator.*

*37. The system of claim 28 further comprising a valve bridge between the first rocker arm and the one or more valves associated with the engine cylinder.*

*38. The system of claim 37 further comprising means for actuating a valve through the valve bridge using the second rocker arm.*

*39. The system of claim 34 further comprising a valve bridge between the third rocker arm and the one or more additional valves associated with the engine cylinder.*

*40. An engine valve actuation system for positive power mode and two-cycle compression brake mode engine operation, said system comprising:*

*an exhaust rocker arm positioned to selectively actuate an exhaust valve;*

*a first hydraulic lash adjuster positioned between the exhaust rocker arm and the exhaust valve;*

*a brake rocker arm positioned to selectively actuate the exhaust valve; and*

*a second hydraulic lash adjuster positioned between the brake rocker arm and the exhaust valve.*

*41. The system of claim 40 further comprising:*

*means for selectively providing hydraulic fluid to the first hydraulic lash adjuster during positive power mode operation; and*

*means for selectively providing hydraulic fluid to the second hydraulic lash adjuster during compression brake mode operation.*

*42. The system of claim 41 wherein the first hydraulic lash adjuster extends out of an end of the exhaust rocker arm.*

*43. The system of claim 42 wherein the second hydraulic lash adjuster extends out of an end of the brake rocker arm.*

*44. The system of claim 40 further comprising a valve bridge between the exhaust rocker arm and the exhaust valve.*

*45. The system of claim 44 further comprising means for actuating the exhaust valve through the valve bridge using the brake rocker arm.*

*46. The system of claim 40 further comprising a brake cam in operative contact with the second rocker arm, said brake cam having at least one compression-release lobe and at least one exhaust gas recirculation lobe.*

*47. The system of claim 28 further comprising a brake cam in operative contact with the second rocker arm, said brake cam having at least one compression-release lobe and at least one exhaust gas recirculation lobe.*

*48. A method for positive power mode and compression brake mode engine valve actuation in a system having first and second rocker arms used to actuate an engine valve, said method comprising the steps of:*

*providing hydraulic fluid to a first lash adjuster associated with the first rocker arm and draining hydraulic fluid from a second lash adjuster associated with the second rocker arm during positive power mode;*

*actuating the engine valve with the first rocker arm during positive power mode;*

*providing hydraulic fluid to the second lash adjuster and draining hydraulic fluid from the first lash adjuster during compression brake mode; and*

*actuating the engine valve with the second rocker arm during compression brake mode,*

*wherein the compression brake mode comprises a first compression release event and a second compression release event.*

*49. The method of claim 48 wherein the engine valve is actuated two times per engine cycle during compression brake mode near piston top dead center position to achieve two-cycle compression braking.*

*50. The method of claim 48 wherein the engine valve is actuated to achieve exhaust gas recirculation during compression brake mode.*

* * * * *